United States Patent
Arai et al.

(10) Patent No.: US 12,436,403 B2
(45) Date of Patent: Oct. 7, 2025

(54) OPTICAL DEVICE, BINOCLE, CONTROL METHOD FOR OPTICAL DEVICE, AND PROGRAM

(71) Applicant: FUJIFILM CORPORATION, Tokyo (JP)

(72) Inventors: Masaki Arai, Saitama (JP); Junichi Yokoyama, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 635 days.

(21) Appl. No.: 17/660,635

(22) Filed: Apr. 26, 2022

(65) Prior Publication Data
US 2022/0252897 A1    Aug. 11, 2022

Related U.S. Application Data

(63) Continuation of application No. PCT/JP2020/039762, filed on Oct. 22, 2020.

(30) Foreign Application Priority Data

Nov. 19, 2019   (JP) ................... 2019-209091

(51) Int. Cl.
G02B 27/64     (2006.01)
G02B 23/02     (2006.01)

(52) U.S. Cl.
CPC ........... *G02B 27/646* (2013.01); *G02B 23/02* (2013.01)

(58) Field of Classification Search
CPC ... G03B 5/00; G03B 2217/005; G02B 27/646
See application file for complete search history.

(56) References Cited

U.S. PATENT DOCUMENTS

| | | | | |
|---|---|---|---|---|
| 5,881,325 A * | 3/1999 | Imura | ..... | G03B 5/00 348/208.11 |
| 5,905,917 A * | 5/1999 | Imura | ..... | G03B 5/00 396/55 |

(Continued)

FOREIGN PATENT DOCUMENTS

| | | |
|---|---|---|
| JP | H04-034526 A | 2/1992 |
| JP | 2001-209084 A | 8/2001 |

(Continued)

OTHER PUBLICATIONS

International Search Report issued in International Application No. PCT/JP2020/039762 on Dec. 28, 2020.

(Continued)

*Primary Examiner* — Christopher Stanford
(74) *Attorney, Agent, or Firm* — SOLARIS Intellectual Property Group, PLLC

(57) ABSTRACT

An optical device which includes an optical system includes a sensor that detects vibration on the optical device, an anti-vibration mechanism that includes a drive source driven based on a result of detection performed by the sensor, a fixation mechanism that fixes a position of the anti-vibration mechanism by coming into contact with a specific portion of the anti-vibration mechanism, and a processor that performs control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state.

16 Claims, 14 Drawing Sheets

(56) References Cited

U.S. PATENT DOCUMENTS

| | | | | |
|---|---|---|---|---|
| 6,614,994 | B2 * | 9/2003 | Ohishi | ............... G03B 5/00 396/55 |
| 7,123,290 | B2 * | 10/2006 | Ohishi | ............... G03B 5/00 348/208.4 |
| 2004/0017485 | A1 | 1/2004 | Ohishi | |
| 2014/0078329 | A1 | 3/2014 | Uenaka | |

FOREIGN PATENT DOCUMENTS

| | | |
|---|---|---|
| JP | 2003-241247 A | 8/2003 |
| JP | 2005-202358 A | 7/2005 |
| JP | 2014-059406 A | 4/2014 |
| WO | 2014/192464 A1 | 12/2014 |

OTHER PUBLICATIONS

Written Opinion of the ISA issued in International Application No. PCT/JP2020/039762 on Dec. 28, 2020.

\* cited by examiner

[RELEASE STATE]

[FIXATION STATE]

OPTICAL DEVICE, BINOCLE, CONTROL METHOD FOR OPTICAL DEVICE, AND PROGRAM

CROSS-REFERENCE TO RELATED APPLICATIONS

This application is a continuation application of International Application No. PCT/JP2020/039762, filed Oct. 22, 2020, the disclosure of which is incorporated herein by reference in its entirety. Further, this application claims priority from Japanese Patent Application No. 2019-209091, filed Nov. 19, 2019, the disclosure of which is incorporated herein by reference in its entirety.

BACKGROUND OF THE INVENTION

Field of the Invention

The present disclosed technology relates to an optical device, a binocle, a control method for an optical device, and a program.

Description of the Related Art

Disclosed in JP1992-034526A (JP-H04-034526A) is an image shake prevention device. The image shake prevention device described in JP1992-034526A (JP-H04-034526A) is an inertial pendulum type image shake prevention device including a correction optical unit that includes a correction lens group composed of a stationary lens group and a movable lens group held in a lens barrel and that performs image shake correction, a relative position detection unit that detects the relative position of the movable lens group with respect to the stationary lens group, a restriction unit that generates a driving force for restricting relative displacement of the movable lens group with respect to the stationary lens group based on output of the relative position detection unit, and a fixing unit that temporarily fixes the movable lens group. In the image shake prevention device, a holding unit that obtains, from the relative position detection unit, information about the relative position of the movable lens group in a state of being fixed by the fixing unit with respect to the stationary lens group and holds the information as movable lens group reference position data and a calculation unit that subtracts, from the output of the relative position detection unit, the reference position data from the holding unit at the time of an anti-vibration operation and outputs a value obtained through the subtraction to the restriction unit as output of the relative position detection unit at that time are provided.

SUMMARY OF THE INVENTION

An embodiment of the present disclosed technology provides an optical device, a binocle, a control method for an optical device, and a program with which it is possible to avoid an increase in current consumption in a drive source caused by interference between a specific portion of an anti-vibration mechanism and a fixation mechanism in comparison with a case where the anti-vibration mechanism is caused to continuously oscillate in accordance with the result of detection performed by a sensor that capable of detecting vibration on the optical device at all times.

According to a first aspect of the present disclosed technology, there is provided an optical device which includes an optical system, the optical device including a sensor that detects vibration on the optical device, an anti-vibration mechanism that includes a drive source driven based on a result of detection performed by the sensor, a fixation mechanism that fixes a position of the anti-vibration mechanism by coming into contact with a specific portion of the anti-vibration mechanism, and a processor that performs control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state.

According to a second aspect of the present disclosed technology, in the optical device related to the first aspect, the processor may control the drive source with a third value obtained based on a first value related to a driving force of the drive source based on the result of the detection and a second value related to a driving force of the drive source in a direction for aligning the specific portion with a reference position determined in advance.

According to a third aspect of the present disclosed technology, in the optical device related to the second aspect, the processor may adjust the third value by changing a degree of difference between the first value and the second value.

According to a fourth aspect of the present disclosed technology, in the optical device related to the third aspect, the degree of difference may be a ratio between the first value and the second value.

According to a fifth aspect of the present disclosed technology, in the optical device related to any one of the second to fourth aspects, while the fixation mechanism is switching from one of the fixation state and the release state to the other of the fixation state and the release state, the processor may perform control such that the closer the fixation mechanism is to the fixation state, the larger the second value is made with respect to the first value and the closer the fixation mechanism is to the release state, the smaller the second value is made with respect to the first value.

According to a sixth aspect of the present disclosed technology, in the optical device related to any one of the second to fifth aspects, while the fixation mechanism is switching from one of the fixation state and the release state to the other of the fixation state and the release state, the processor may perform control such that the third value is made smaller than the third value obtained in a case where the fixation mechanism is in the release state.

According to a seventh aspect of the present disclosed technology, in the optical device related to any one of the second to sixth aspects, while the fixation mechanism is switching from one of the fixation state and the release state to the other of the fixation state and the release state, the processor may perform control such that the first value is made smaller than the first value obtained in a case where the fixation mechanism is in the release state.

According to an eighth aspect of the present disclosed technology, in the optical device related to the sixth aspect, the processor may determine, in accordance with the result of the detection performed by the sensor, whether to make the third value smaller than the third value obtained in a case where the fixation mechanism is in the release state while the fixation mechanism is switching from one of the fixation state and the release state to the other of the fixation state and the release state.

According to a ninth aspect of the present disclosed technology, in the optical device related to the seventh aspect, the processor may determine, in accordance with the result of the detection performed by the sensor, whether to make the first value smaller than the first value obtained in a case where the fixation mechanism is in the release state while the fixation mechanism is switching from one of the fixation state and the release state to the other of the fixation state and the release state.

According to a tenth aspect of the present disclosed technology, in the optical device related to any one of the first to ninth aspects, the anti-vibration mechanism may include a gimbal structure and the gimbal structure may be operated in the anti-vibration mechanism in accordance with a driving force of the drive source.

According to an eleventh aspect of the present disclosed technology, in the optical device related to any one of the first to tenth aspects, the fixation mechanism may include a displacement member and the displacement member may be displaced between a first position for the fixation state of the anti-vibration mechanism and a second position for the release state of the anti-vibration mechanism.

According to a twelfth aspect of the present disclosed technology, in the optical device related to any one of the eleventh aspect, the specific portion may be a protruding portion protruding from the anti-vibration mechanism and the displacement member may hold the protruding portion at the first position and release the protruding portion at the second position.

According to a thirteenth aspect of the present disclosed technology, in the optical device related to any one of the first to twelfth aspects, the anti-vibration mechanism may include a holder holding the optical system and the anti-vibration mechanism may cause the holder to oscillate in accordance with a driving force of the drive source corresponding to the result of the detection performed by the sensor.

According to a fourteenth aspect of the present disclosed technology, in the optical device related to any one of the first to thirteenth aspects, the processor may adjust a driving force of the drive source by performing feedback control with respect to the drive source.

According to a fifteenth aspect of the present disclosed technology, there is provided a binocle including the optical device related to any one of the first to fourteenth aspects and an ocular lens on which observation target light indicating an observation target is incident via the optical system.

According to a sixteenth aspect of the present disclosed technology, there is provided a control method for an optical device having an optical system, the optical device including a sensor that detects vibration on the optical device, an anti-vibration mechanism that includes a drive source driven based on a result of detection performed by the sensor, and a fixation mechanism that fixes a position of the anti-vibration mechanism by coming into contact with a specific portion of the anti-vibration mechanism, the method including performing control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state.

According to a seventeenth aspect of the present disclosed technology, there is provided a program that causes a computer applied to an optical device having an optical system, the optical device including a sensor that detects vibration on the optical device, an anti-vibration mechanism that includes a drive source driven based on a result of detection performed by the sensor, and a fixation mechanism that fixes a position of the anti-vibration mechanism by coming into contact with a specific portion of the anti-vibration mechanism, to execute a process including performing control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state.

DESCRIPTION OF THE PREFERRED EMBODIMENTS

Hereinafter, an example of an embodiment of a distance measurement imaging apparatus according to the present disclosed technology will be described with reference to the accompanying drawings.

First, terms used in the following description will be described.

"CPU" is the abbreviation of "Central Processing Unit". "RAM" is the abbreviation for "Random Access Memory". "EEPROM" is the abbreviation of "Electrically Erasable Programmable Read-Only Memory". "SSD" is the abbreviation of "Solid State Drive". "ASIC" is the abbreviation of "Application Specific Integrated Circuit". "PLD" is the abbreviation of "Programmable Logic Device". "FPGA" is the abbreviation of "Field-Programmable Gate Array". "SoC" is the abbreviation of "System-on-a-chip". "USB" is the abbreviation of "Universal Serial Bus". "HDD" is the abbreviation of "Hard Disk Drive".

In the description of the present specification, the meaning of "being the same as each other" includes not only "being completely the same as each other" but also "being the same as each other with an error generally acceptable in a technical field to which the present disclosed technology belongs". In the description of the present specification, the meaning of "being parallel with each other" includes not only "being completely parallel with each other" but also "being parallel with each other with an error generally acceptable in a technical field to which the present disclosed technology belongs". In the description of the present specification, the meaning of "coinciding with as each other" includes not only "being completely coinciding with each other" but also "coinciding with each other with an error generally acceptable in a technical field to which the present disclosed technology belongs".

First Embodiment

Figure 1:
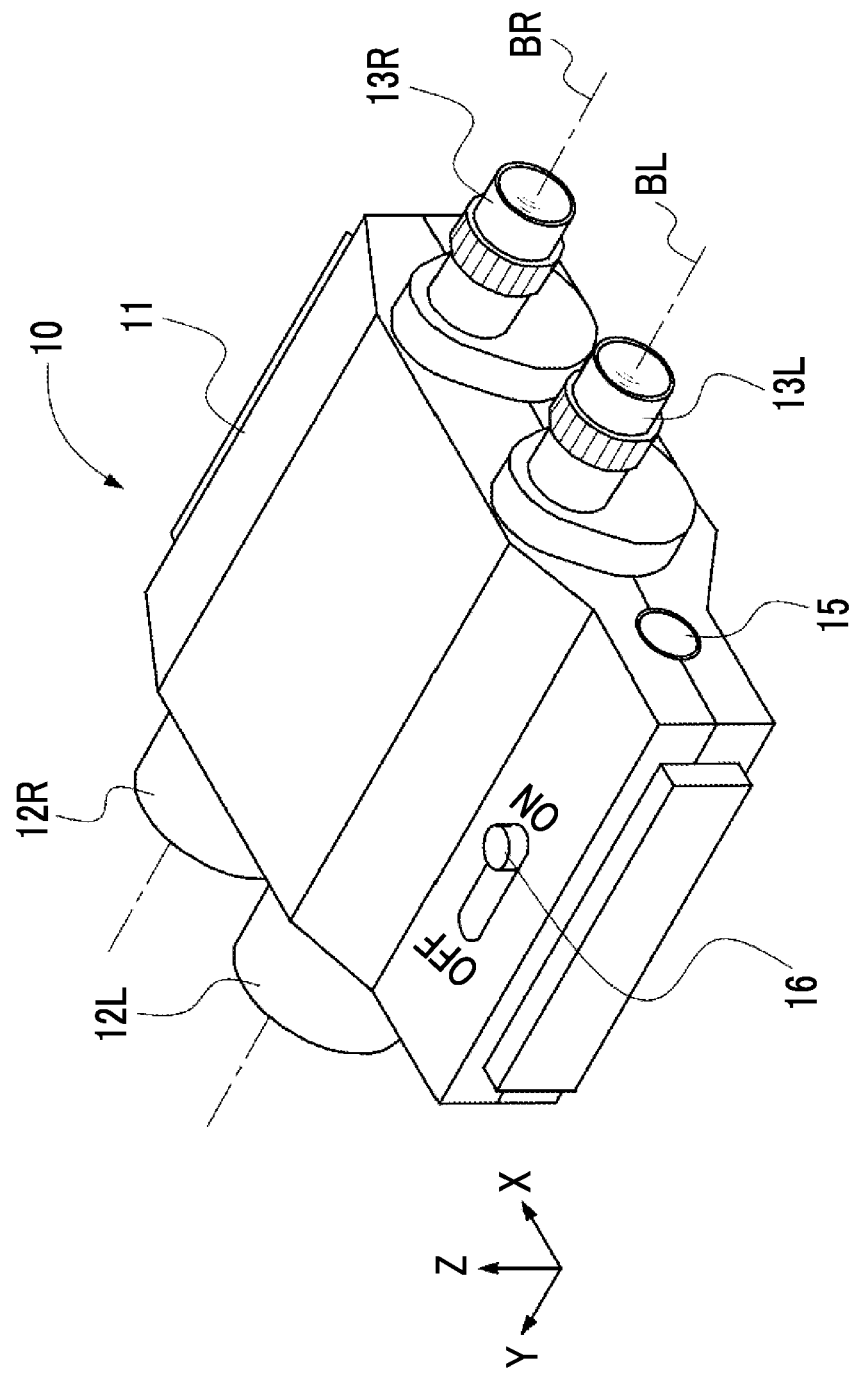
FIG. 1 is a schematic perspective view showing an example of the appearance of a binocle according to a first embodiment.

For example, as shown in FIG. 1, a binocle 10 is an example of an "optical device" according to the present disclosed technology and includes a housing 11 having a substantially rectangular shape, a pair of objective lens units 12R and 12L provided in front of the housing 11, and a pair of ocular lens units 13R and 13L provided behind the housing 11. In the following description, a width direction of the binocle 10 will be referred to as a direction X, a front-rear direction of the binocle 10 will be referred to as a direction Y, and a vertical direction of the binocle 10 will be referred to as a direction Z. In addition, a direction toward an observation target of the binocle 10, that is, a direction in which the objective lens units 12R and 12L of the binocle 10 are disposed will be referred to as a forward direction. In addition, a direction in which a user of the binocle 10 (hereinafter, simply referred to as "user") is positioned, that is, a direction in which the ocular lens units 13R and 13L are disposed will be referred to as a rearward direction. Furthermore, an optical system for generating an image to be observed by the right eye of the user will be referred to as a right eye optical system and an optical system for generating an image to be observed by the left eye of the user will be referred to as a left eye optical system. The right eye optical system and the left eye optical system are examples of an "optical system" according to the present disclosed technology. In the following description, for the sake of convenience, the right eye optical system and the left eye optical system will be referred to as "optical systems" in a case where the right eye optical system and the left eye optical system do not need to be distinguished from each other.

The objective lens unit 12R and the ocular lens unit 13R are arranged along the direction Y and form a part of the right eye optical system. The objective lens unit 12L and the ocular lens unit 13L are arranged along the direction Y and form a part of the left eye optical system.

A rear surface of the housing 11 is provided with a push button type power switch 15. In a case where the power switch 15 is pressed, the binocle 10 is switched on and off.

An upper surface of the housing 11 is provided with a slide type anti-vibration switch 16. In a case where the anti-vibration switch 16 is slid rearward, an anti-vibration operation (hereinafter, may be simply referred to as "anti-vibration operation") performed by an anti-vibration mechanism 30 (refer to FIGS. 2 and 3), which will be described later, is started. In a case where the anti-vibration switch 16 is slid forward, the anti-vibration operation is stopped.

Figure 2:
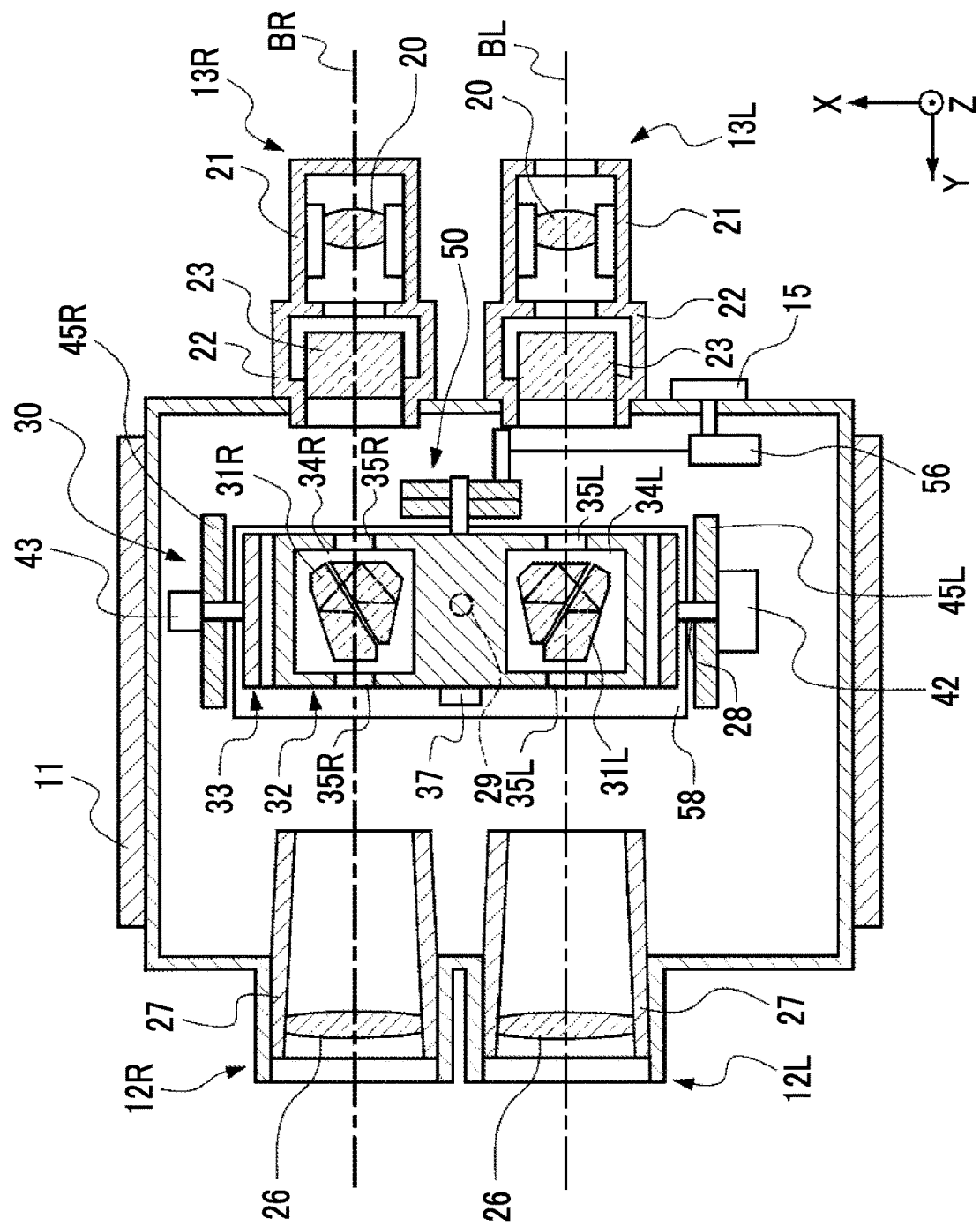
FIG. 2 is a cross-sectional view showing an example of the internal configuration of the binocle according to the first embodiment.
Figure 3:
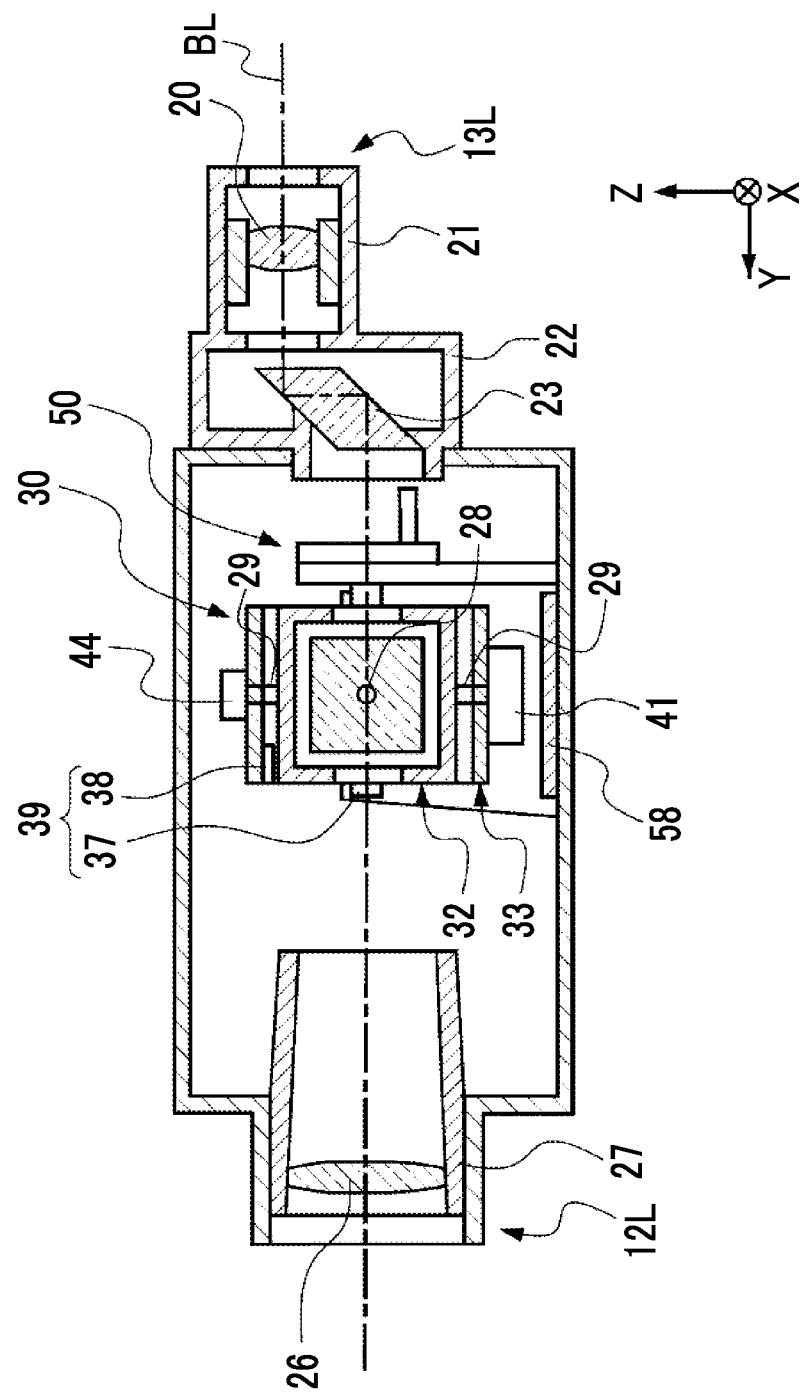
FIG. 3 is a vertical cross-sectional view showing an example of the internal configuration of the binocle according to the first embodiment.

For example, as shown in FIGS. 2 and 3, the housing 11 accommodates the anti-vibration mechanism 30. The anti-vibration mechanism 30 is a mechanism that prevents generation of an image shake caused by vibration (hereinafter, may be simply referred to as "vibration") with respect to the binocle 10. Examples of the vibration include vibration caused by a camera shake received by the binocle 10. Here, the "image" refers to, for example, an optical image that is formed in a case where observation target light indicating an observation target is incident on the optical systems. The anti-vibration mechanism 30 is disposed between the objective lens units 12R and 12L and the ocular lens units 13R and 13L in the direction Y. The anti-vibration mechanism 30 is an example of an "anti-vibration mechanism" according to the present disclosed technology.

Each of the ocular lens units 13R and 13L includes an ocular lens 20, an ocular barrel 21 holding the ocular lens 20, and a prism holder 22 connected to the ocular barrel 21. The prism holder 22 accommodates a bending prism 23. The bending prism 23 bends an incidence ray so that the optical axis thereof is shifted. In an example shown in FIG. 3, a left eye optical axis BL is shifted in a Z-axis direction by the bending prism 23.

Each of the objective lens units 12R and 12L includes an objective lens 26 and an objective barrel 27 holding the objective lens 26. In FIGS. 2 and 3, for the sake of convenience of illustration, each of the ocular lenses 20 and the objective lenses 26 is drawn as one lens. However, each of the ocular lenses 20 and the objective lenses 26 is a lens group including a plurality of lenses.

The anti-vibration mechanism 30 accommodates correction optical elements 31R and 31L. The correction optical elements 31R and 31L are, for example, roof prism type erecting prisms and restore inverted images formed by the objective lenses 26 and the ocular lenses 20 to erecting images. Note that as the correction optical elements 31R and 31L, Porro prism type erecting prisms may be used and erecting lenses may also be used instead of the erecting prisms.

The right eye optical system includes the objective lens 26, the correction optical element 31R, and the bending prism 23. Along a right eye optical axis BR, the objective lens 26, the correction optical element 31R, and the bending prism 23 are disposed in the order of the objective lens 26, the correction optical element 31R, and the bending prism 23 from an observation target side. The left eye optical system includes the objective lens 26, the correction optical element 31L, and the bending prism 23. Along a left eye optical axis BL, the objective lens 26, the correction optical element 31L, and the bending prism 23 are disposed in the order of the objective lens 26, the correction optical element 31L, and the bending prism 23 from the observation target side. The observation target light is incident on the ocular lenses 20 via the right eye optical system and the left eye optical system. Accordingly, the user can observe the observation target as if the enlarged observation target is in front of the eyes of the user by viewing the observation target through the right eye optical system and the left eye optical system.

Figure 4:
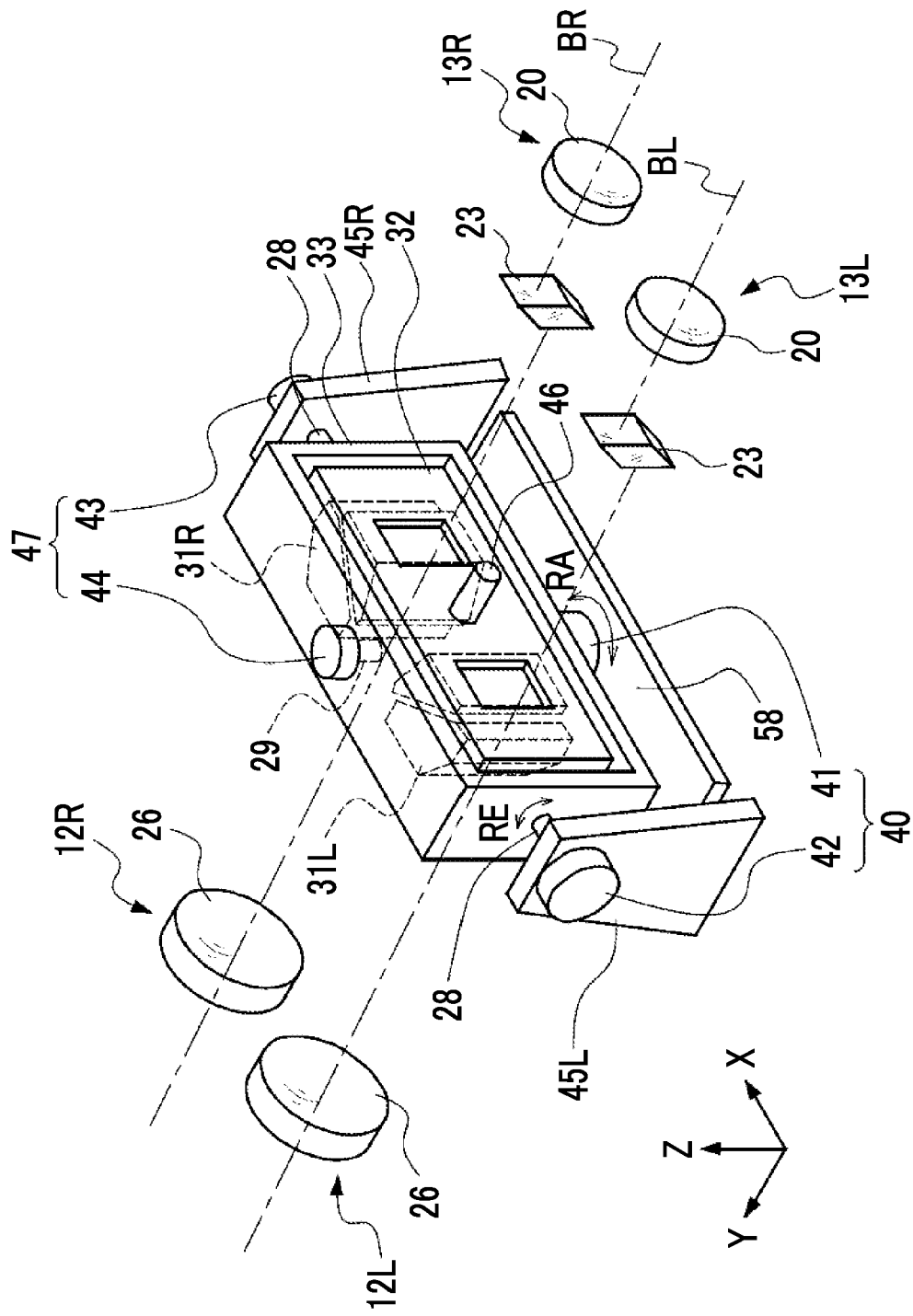
FIG. 4 is a perspective view showing an example of the configurations of an optical system and an anti-vibration mechanism included in the binocle according to the first embodiment.
Figure 9:
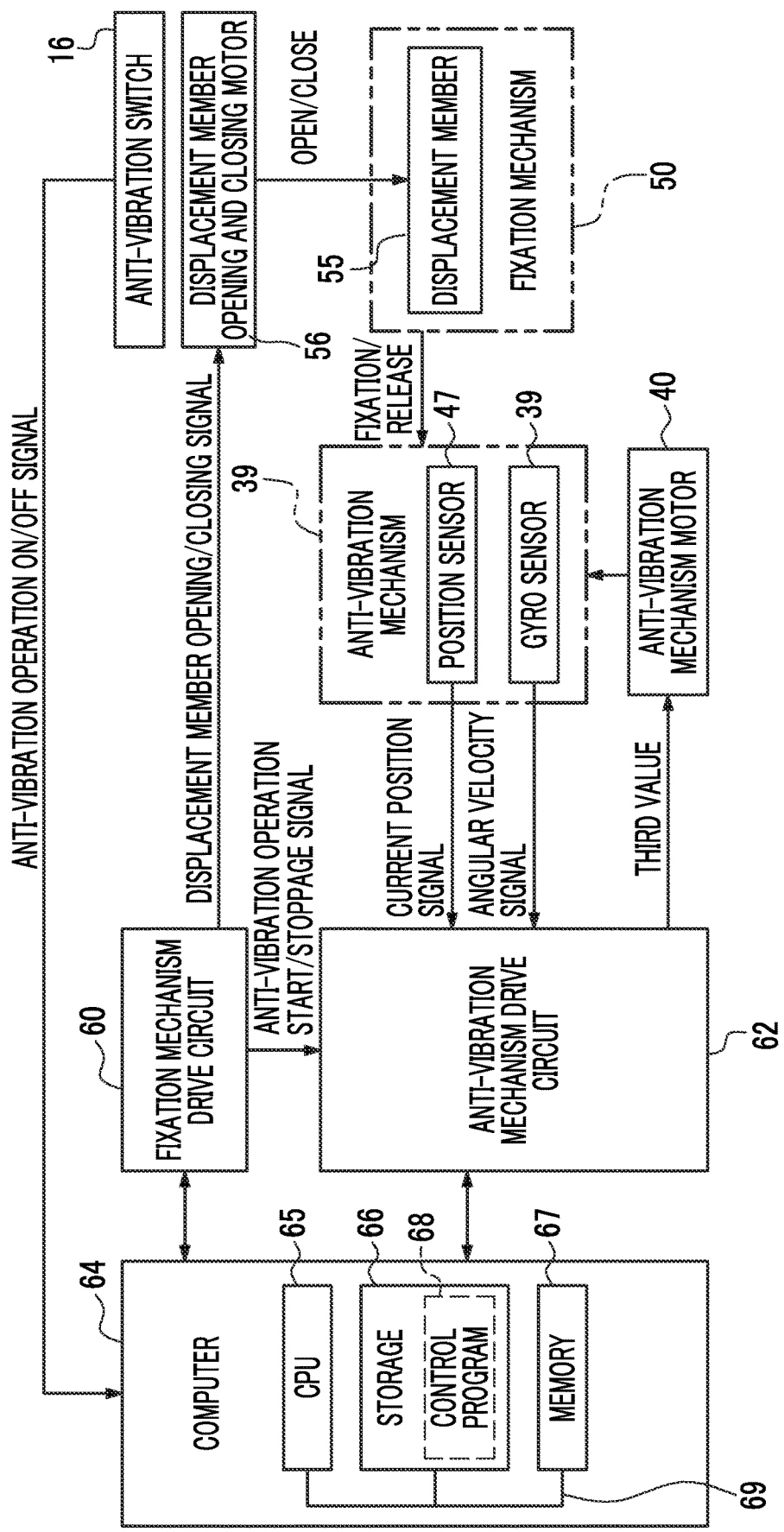
FIG. 9 is a block diagram showing an example of the electrical hardware configuration of the binocle according to the first embodiment.

For example, as shown in FIG. 4, the anti-vibration mechanism 30 includes, for example, a gimbal structure and the gimbal structure is operated in accordance with a driving force of an anti-vibration mechanism motor 40 (refer to FIG. 9). In a case where the gimbal structure is operated, vibration applied to the housing 11 is canceled out and thus an image shake is corrected. Here, the meaning of "to cancel out" includes not only "to cancel out vibration so that an image shake is completely eliminated" but also "to cancel out vibration to an extent that an image shake is reduced".

For example, as shown in FIGS. 2 and 4, the anti-vibration mechanism 30 includes a first holder 32 and a second holder 33. The first holder 32 and the second holder 33 are examples of "holders" according to the present disclosed technology. The first holder 32 holds the correction optical elements 31R and 31L. The second holder 33 holds the first holder 32. The first holder 32 has a rectangular parallelepiped shape and is disposed with a longitudinal direction thereof being parallel with the direction X. The first holder 32 is supported by a rotary shaft 29 and is rotatable around the rotary shaft 29 in a direction (refer to FIG. 4) along an arrow RA around a Z-axis, the rotary shaft 29 being provided at the second holder 33 along the direction Z.

The first holder 32 includes an element accommodation portion 34R on the right eye optical axis BR and an element accommodation portion 34L on the left eye optical axis BL (refer to FIG. 2). The element accommodation portion 34R accommodates the correction optical element 31R and the element accommodation portion 34L accommodates the correction optical element 31L. Openings 35R are provided in a front surface and a rear surface of the first holder 32. Through the openings 35R, the correction optical element 31R in the element accommodation portion 34R is exposed on the right eye optical axis BR. In addition, openings 35L are provided in the front surface and the rear surface of the first holder 32. Through the openings 35L, the correction optical element 31L in the element accommodation portion 34L is exposed on the left eye optical axis BL.

The second holder 33 has a rectangular parallelepiped shape larger than that of the first holder 32, and is disposed with a longitudinal direction thereof being parallel with the direction X. In a case where the second holder 33 is in a posture as shown in FIG. 4, the second holder 33 has a frame shape including a surface parallel with the right eye optical axis BR and the left eye optical axis BL and the first holder 32 is rotatably accommodated therein. The second holder 33 is supported by a rotary shaft 28 and is rotatable in a direction along an arrow RE around an X-axis, the rotary shaft 28 being provided along the direction X. The rotary shaft 28 is supported by a pair of bearing portions 45R and 45L provided in the housing 11 and the correction optical elements 31R and 31L are rotatable around the rotary shaft 28 and around the X-axis.

For example, as shown in FIG. 4, the anti-vibration mechanism 30 includes a position sensor 47. The position sensor 47 detects angles that change in the case of relative rotation of the housing 11 and the correction optical elements 31R and 31L. Angles detected by the position sensor 47 (hereinafter, also simply referred to as "angles") are roughly classified into the angle of the second holder 33 around the X-axis and the angle of the first holder 32 around the Z-axis. The position sensor 47 includes an X-axis position sensor 43 and a Z-axis position sensor 44. The X-axis position sensor 43 is attached to the bearing portion 45R. The X-axis position sensor 43 is connected to one end of the rotary shaft 28 and detects the angle of the second holder 33 rotated around the X-axis, that is, the angle of the second holder 33 around the X-axis. The Z-axis position sensor 44 is attached to the second holder 33. The Z-axis position sensor 44 is connected to one end of the rotary shaft 29 and detects the angle of the first holder 32 rotated around the Z-axis, that is, the angle of the first holder 32 around the Z-axis. Here, rotary position sensors are used as the X-axis position sensor 43 and the Z-axis position sensor 44. Note that a resolver, a synchro, a rotary encoder, or the like may be used instead of the rotary position sensors.

For example, as shown in FIG. 3, the anti-vibration mechanism 30 includes a gyro sensor 39. The gyro sensor 39 is a sensor that can detect vibration, and is an example of a "sensor" according to the present disclosed technology. The gyro sensor 39 detects the angular velocity of the relative rotation of the housing 11 and the correction optical elements 31R and 31L. The gyro sensor 39 includes an X-axis gyro sensor 38 and a Z-axis gyro sensor 37. The X-axis gyro sensor 38 is attached to an upper surface of an inner wall of the second holder 33 and detects the angular velocity of the second holder 33 rotated around the X-axis, that is, the angular velocity of the second holder 33 around the X-axis. The Z-axis gyro sensor 37 is attached to a front surface of the first holder 32 and detects the angular velocity of the first holder 32 rotated around the Z-axis, that is, the angular velocity of the first holder 32 around the Z-axis. As each of the X-axis gyro sensor 38 and the Z-axis gyro sensor 37, for example, a piezoelectric vibration gyro sensor that includes a circular columnar vibrator and a plurality of piezoelectric ceramics and uses a Coriolis force is used. Note that instead of the piezoelectric vibration gyro sensor in which the circular columnar vibrator is used, a piezoelectric vibration gyro sensor in which a triangular columnar vibrator, a quadrangular columnar vibrator, or a tuning fork-shaped vibrator is used may be used.

In a case where the binocle 10 is used in a state of being held by a hand, vibration on the housing 11 due to the influence of a camera shake or the like and the vibration causes a shake in an image observed through the binocle 10. However, according to the anti-vibration mechanism 30 including the gimbal structure, an inertial force acts on the anti-vibration mechanism 30 against the vibration and thus the correction optical elements 31R and 31L oscillate. Accordingly, relative displacement occurs between the correction optical elements 31R and 31L, the objective lens units 12R and 12L, and the ocular lens units 13R and 13L and thus the shake in the observed image is reduced.

The gyro sensor 39 detects vibration on the housing 11 by detecting the angular velocities of the correction optical elements 31R and 31L around the X-axis and the Z-axis. For example, as shown in FIG. 4, the anti-vibration mechanism 30 includes the anti-vibration mechanism motor 40. The anti-vibration mechanism motor 40 is driven based on the result of detection performed by the gyro sensor 39. The anti-vibration mechanism motor 40 generates a driving force and is mechanically connected to the rotary shafts 28 and 29 such that the generated driving force is transmitted to the rotary shafts 28 and 29. The anti-vibration mechanism 30 causes the first holder 32 and the second holder 33 to oscillate in accordance with the driving force of the anti-vibration mechanism motor 40 corresponding to the result of detection performed by the gyro sensor 39. Note that the anti-vibration mechanism motor 40 is an example of a "drive source" according to the present disclosed technology.

More specifically, the anti-vibration mechanism motor 40 rotates the correction optical elements 31R and 31L based on the result of detection performed by the gyro sensor 39 to cancel out vibration on the housing 11. The anti-vibration mechanism motor 40 includes an X-axis motor 42 and a Z-axis motor 41. The X-axis motor 42 is attached to the bearing portion 45L. The X-axis motor 42 is connected to one end of the rotary shaft 28 and rotates the second holder 33 around the X-axis via the rotary shaft 28. The Z-axis motor 41 is attached to the second holder 33. The Z-axis motor 41 is connected to one end of the rotary shaft 29 and rotates the first holder 32 around the Z-axis via the rotary shaft 29. In a case where the anti-vibration mechanism motor 40 rotates the second holder 33 and the first holder 32 in this manner, the correction optical elements 31R and 31L rotate around the X-axis and rotate around the Z-axis such that vibration on the housing 11 is canceled out.

Figure 5:
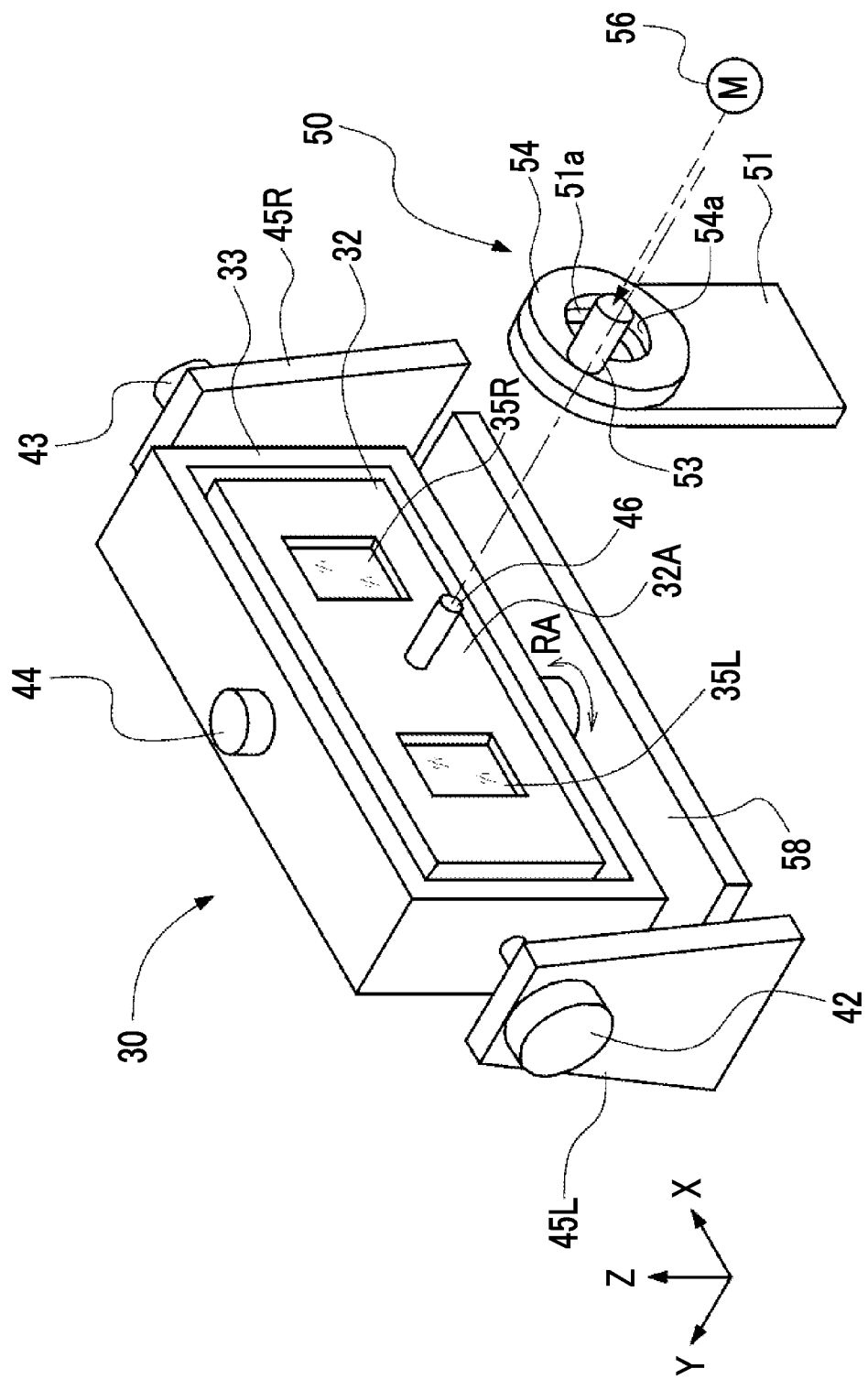
FIG. 5 is a perspective view showing an example of the configurations of the anti-vibration mechanism and a fixation mechanism included in the binocle according to the first embodiment.

For example, as shown in FIG. 5, the anti-vibration mechanism 30 includes a fixation mechanism 50 on a rear surface side of the housing 11. The anti-vibration mechanism 30 includes a fixation rod 46. The fixation rod 46 is a protruding portion protruding from the anti-vibration mechanism 30. Specifically, the fixation rod 46 protrudes rearward, from a central portion of a rear surface 32A of the first holder 32, in a circular columnar shape along an optical axis. The fixation mechanism 50 comes into contact with the fixation rod 46 provided on the anti-vibration mechanism 30 so that the position of the anti-vibration mechanism 30 is fixed. The fixation rod 46 is an example of a "specific portion" and a "protruding portion" according to the present disclosed technology.

The fixation mechanism 50 includes a substrate portion 51 fixed to the housing 11, a rotary ring 54 disposed on a rear surface side of the substrate portion 51, and a displacement member 55 (refer to FIG. 6) incorporated between the substrate portion 51 and the rotary ring 54. The substrate portion 51 and the rotary ring 54 are respectively provided with circular openings 51a and 54a into which the fixation rod 46 is inserted. The rotary ring 54 is rotatable around the opening 54a with respect to the substrate portion 51. A pin 53 is erected on the rotary ring 54 and the pin 53 is connected to a displacement member opening and closing motor 56 provided in the housing 11.

The displacement member 55 is displaced between a first position for a fixation state where the position of the anti-vibration mechanism 30 is fixed and a second position for a release state where the fixation state is released. The displacement member 55 is supported by a rotary shaft (not shown) provided for the substrate portion 51 and the rotary ring 54. The first position is a position where the displacement member 55 protrudes into the openings 51a and 54a because of rotation of the rotary ring 54. The second position is a position where the displacement member 55 is withdrawn from the openings 51a and 54a because of rotation of the rotary ring 54.

Figure 6:
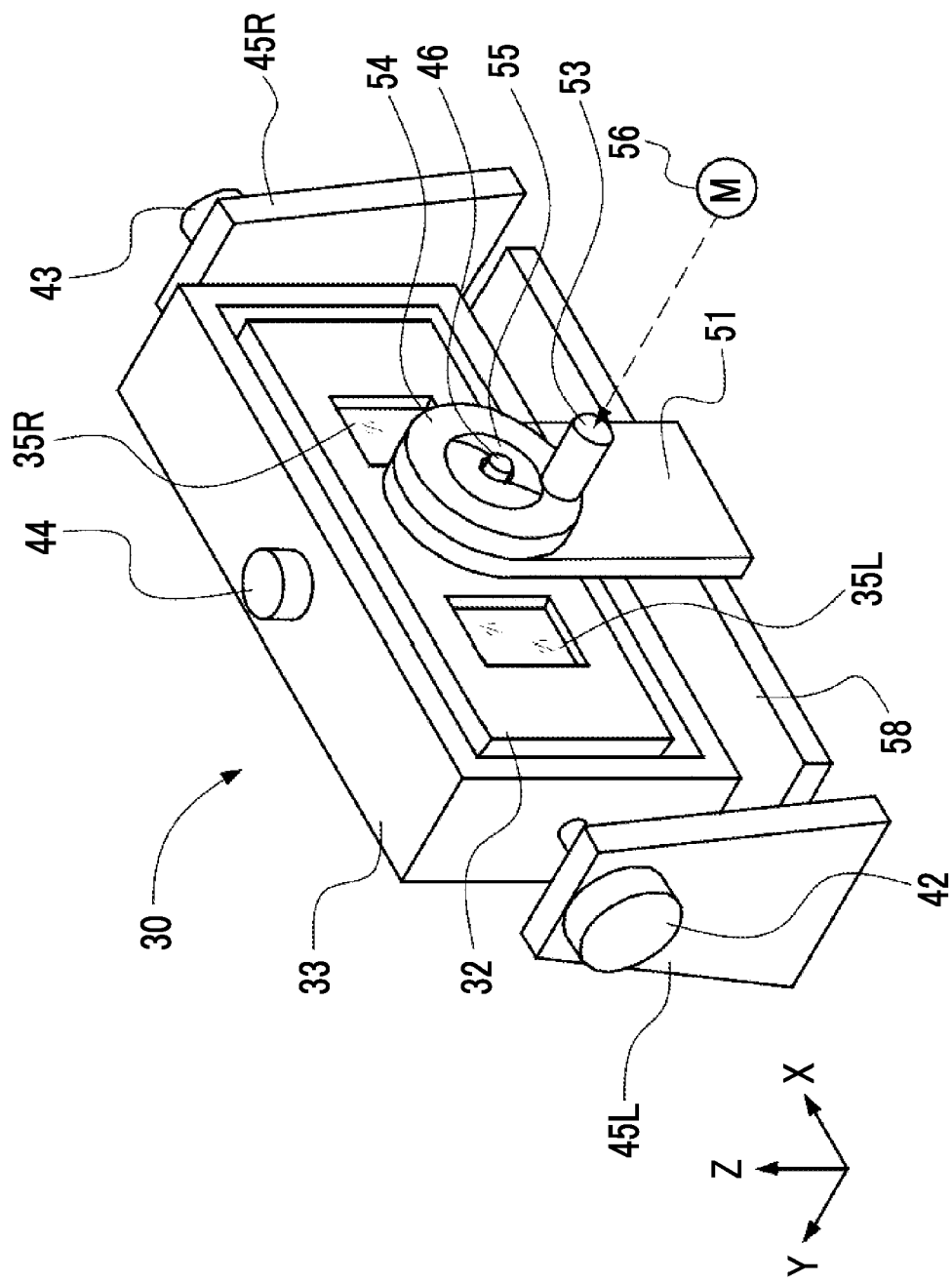
FIG. 6 is a perspective view showing an example of the way in which the anti-vibration mechanism is fixed by the fixation mechanism included in the binocle according to the first embodiment.

At the first position, the displacement member 55 protruding into the openings 51a and 54a enters the fixation state where the fixation rod 46 provided on the anti-vibration mechanism 30 is held and the position of the anti-vibration mechanism 30 is fixed as shown in FIG. 6, for example. On the other hand, in a case where the displacement member 55 is withdrawn from the openings 51a and 54a at the second position, the displacement member 55 enters the release state where the fixation rod 46 is released and the fixation state is released.

Specifically, in a case where the anti-vibration switch 16 is slid forward and the anti-vibration switch 16 is turned off, the displacement member opening and closing motor 56 is driven and the pin 53 is rotated downward. In a case where the pin 53 is rotated downward, the rotary ring 54 is rotated and the displacement member 55 protrudes into the openings 51a and 54a. On the other hand, in a case where the anti-vibration switch 16 is slid rearward and the anti-vibration switch 16 is turned on, the displacement member opening and closing motor 56 is driven in a backward direction and the pin 53 is rotated upward. In a case where the pin 53 is rotated upward, the rotary ring 54 is rotated and the displacement member 55 is withdrawn from the openings 51a and 54a.

Figure 7:
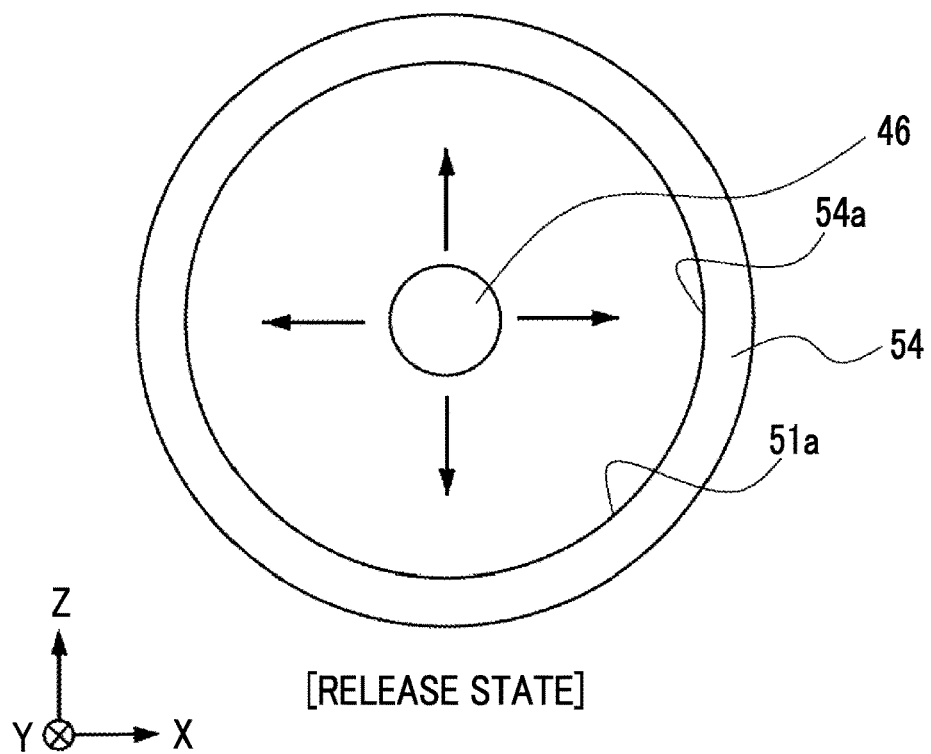
FIG. 7 is a conceptual diagram showing an example of the way in which the fixation mechanism included in the binocle according to the first embodiment releases the fixation rod of the anti-vibration mechanism.

For example, as shown in FIG. 7, in a case where the displacement member 55 is in the release state, the fixation rod 46 can freely move inside the openings 51a and 54a and the anti-vibration mechanism 30 can perform the anti-vibration operation. The anti-vibration mechanism 30 including the gimbal structure corrects the positions of the correction optical elements 31R and 31L with the action of an inertial force and operates the anti-vibration mechanism motor 40 to rotate the correction optical elements 31R and 31L such that vibration is canceled out.

Figure 8:
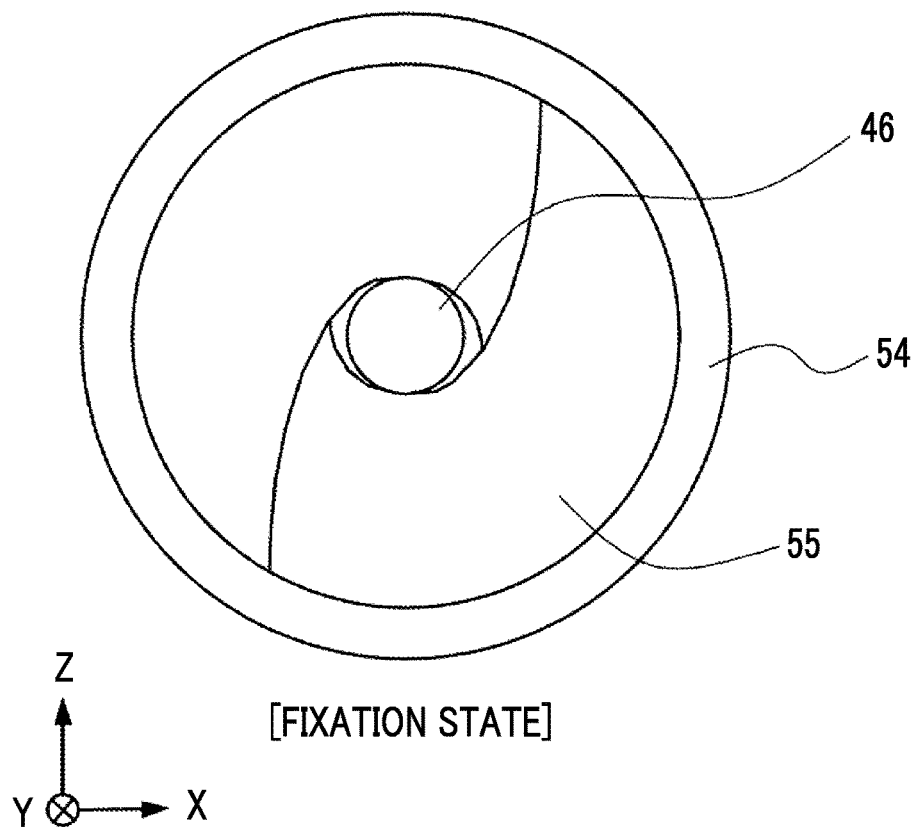
FIG. 8 is a conceptual diagram showing an example of the way in which the fixation mechanism included in the binocle according to the first embodiment fixes the fixation rod of the anti-vibration mechanism.

On the other hand, for example, as shown in FIG. 8, in a case where the displacement member 55 is in the fixation state, the fixation rod 46 is held by the displacement member 55 and thus the position of the anti-vibration mechanism 30 is fixed. Therefore, the anti-vibration mechanism 30 cannot perform the anti-vibration operation. For example, in a case where the displacement member 55 enters the release state while the binocle 10 is being carried, the anti-vibration mechanism 30 is operated in the housing 11 and thus the fixation rod 46 may be damaged due to collision with the fixation mechanism 50. Therefore, it is desirable that the displacement member 55 is in the fixation state during a period in which the binocle 10 is off. In addition, in a case where a fast-moving observation target is to be observed by using the binocle 10, it may not be possible to follow the observation target if the anti-vibration mechanism 30 of a gimbal mechanism is operated. Therefore, even in such a case, it is possible to prevent the anti-vibration mechanism 30 from being operated with the displacement member 55 being in the fixation state.

For example, as shown in FIG. 9, the binocle 10 includes an anti-vibration mechanism drive circuit 62 that drives the anti-vibration mechanism 30, a fixation mechanism drive circuit 60 that drives the fixation mechanism 50, and a computer 64. The fixation mechanism drive circuit 60, the anti-vibration mechanism drive circuit 62, and the computer 64 are mounted on a control substrate 58 (refer to FIG. 3) provided below the first holder 32 and the second holder 33.

The computer 64 includes a CPU 65, a storage 66, and a memory 67. The CPU 65 controls an electrical system of the binocle 10, including the fixation mechanism drive circuit 60, the anti-vibration mechanism drive circuit 62, and the like. The storage 66 stores a control program 68, various parameters, and the like. The memory 67 temporarily stores various information and is used as a work memory. The CPU 65, the storage 66, and the memory 67 are connected to each other via a bus 69. As the CPU 65, a single-core processor is used. A multi-core processor may be used instead of the single-core processor. A non-volatile memory is used as the storage 66. Here, a flash memory is used as the non-volatile memory. Another type of non-volatile memory such as an EEPROM or SSD may be used instead of the flash memory. A volatile memory is used as the memory 67. Here, a DRAM is used as the volatile memory. Another type of volatile memory such as an SRAM may be used instead of the DRAM.

The CPU 65 reads the control program 68 from the storage 66 and executes the read control program 68 on the memory 67 to control the fixation mechanism drive circuit 60 and the anti-vibration mechanism drive circuit 62.

The CPU 65 controls the displacement member opening and closing motor 56 via the fixation mechanism drive circuit 60 such that the displacement member 55 of the fixation mechanism 50 switches between the fixation state and the release state. Specifically, in a case where the anti-vibration switch 16 is turned on, an anti-vibration operation on signal is output to the computer 64. In a case where the CPU 65 receives the anti-vibration operation on signal, a displacement member opening signal for driving the displacement member opening and closing motor 56 is output to the fixation mechanism drive circuit 60. In a case where the displacement member opening signal is received, a drive shaft of the displacement member opening and closing motor 56 is rotated in a direction for withdrawal of the displacement member 55 and thus the fixation mechanism 50 switches from the fixation state to the release state. On the other hand, in a case where the anti-vibration switch 16 is turned off, an anti-vibration operation off signal is output to the computer 64. In a case where the CPU 65 receives the anti-vibration operation off signal, a displacement member closing signal for driving the displacement member opening and closing motor 56 is output to the fixation mechanism drive circuit 60. In a case where the displacement member closing signal is received, the drive shaft of the displacement member opening and closing motor 56 is rotated in a direction for causing the displacement member 55 to protrude and thus the fixation mechanism 50 switches from the release state to the fixation state.

The CPU 65 controls the anti-vibration mechanism 30 via the anti-vibration mechanism drive circuit 62 to cause the anti-vibration mechanism 30 to perform the anti-vibration operation. Here, a control method for the anti-vibration mechanism 30 will be described. Note that the CPU 65 and the anti-vibration mechanism drive circuit 62 are an example of a "processor" according to the present disclosed technology.

Figure 10:
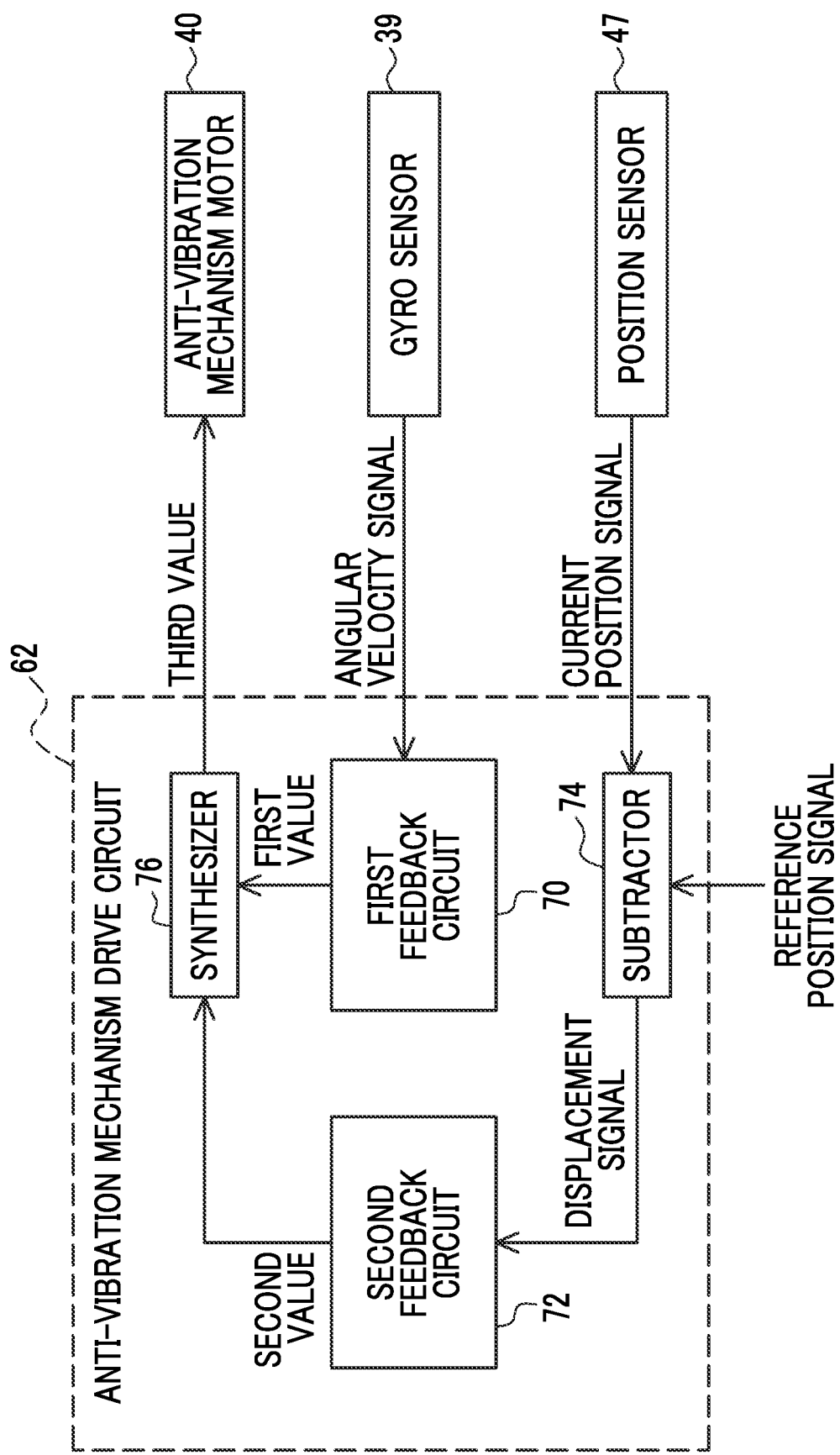
FIG. 10 is a block diagram showing an example of the electrical hardware configuration of an anti-vibration mechanism drive circuit included in the binocle according to the first embodiment.

For example, as shown in FIG. 10, the anti-vibration mechanism drive circuit 62 includes a first feedback circuit 70, a second feedback circuit 72, a subtractor 74, and a synthesizer 76. The gyro sensor 39 detects an angular velocity and outputs an angular velocity signal indicating the detected angular velocity to the first feedback circuit 70. The first feedback circuit 70 obtains a first value based on the angular velocity signal input from the gyro sensor 39 and outputs the first value to the synthesizer 76. The first value refers to a value related to a driving force of the anti-vibration mechanism motor 40 based on the result of the detection performed by the gyro sensor 39, that is, a value related to a driving force for driving the anti-vibration mechanism motor 40 to cancel out vibration (for example, gain applied to anti-vibration mechanism motor 40).

The position sensor 47 detects an angle and outputs an angle signal indicating the detected angle to the subtractor 74 as a current position signal indicating the current positions of the correction optical elements 31R and 31L. A reference position signal indicating the reference positions of the correction optical elements 31R and 31L is given to the subtractor 74 and the subtractor 74 subtracts the reference position signal from the current position signal to obtain a displacement signal indicating displacement of the current positions from the reference positions and outputs the displacement signal. Here, the reference positions refer to the position of the anti-vibration mechanism 30 fixed by the fixation mechanism 50, that is, the positions of the correction optical elements 31R and 31L in the anti-vibration mechanism 30 in the fixation state.

The displacement signal is input to the second feedback circuit 72 from the subtractor 74. The second feedback circuit 72 obtains a second value based on the displacement signal and outputs the second value to the synthesizer 76. The second value refers to a value related to a driving force for driving the anti-vibration mechanism motor 40 in a direction for aligning the correction optical elements 31R and 31L with the reference positions (for example, gain applied to anti-vibration mechanism motor 40).

In a case where the position of the anti-vibration mechanism 30 is fixed by the fixation mechanism 50, the center of the fixation rod 46 provided on the anti-vibration mechanism 30 coincides with the centers of the openings 51a and 54a. Therefore, the above-described "value related to a driving force for driving the anti-vibration mechanism motor 40 in a direction for aligning the correction optical elements 31R and 31L with the reference positions" can be reworded as a "value related to a driving force for driving the anti-vibration mechanism motor 40 in a direction for aligning the fixation rod 46 with the centers of the openings 51a and 54a".

The first value output from the first feedback circuit 70 and the second value output from the second feedback circuit 72 are input to the synthesizer 76. The synthesizer 76 obtains a third value based on the first value and the second value and outputs the third value to the anti-vibration mechanism motor 40. The third value is a value indicating a driving force for driving the anti-vibration mechanism motor 40 (for example, current or voltage input to anti-vibration mechanism motor 40) and is obtained in a case where the synthesizer 76 synthesizes the first value and the second value. Here, synthesis performed by the synthesizer 76 refers to an operation performed by using a value (for example, integrated value) based on a difference between the first value and the second value and a constant (for example, constant used for feedback control).

For example, as shown in FIG. 10, the anti-vibration mechanism drive circuit 62 feeds back the angular velocity signal from the gyro sensor 39 and the current position signal from the position sensor 47 so that the signals are reflected on the driving force of the anti-vibration mechanism motor 40. That is, in the anti-vibration mechanism drive circuit 62, feedback control is performed with respect to the anti-vibration mechanism motor 40 by using the angular velocity signal and the current position signal so that the driving force of the anti-vibration mechanism motor 40 is adjusted. Here, the feedback control refers to control in which the first feedback circuit 70 makes a current angle (value obtained by integrating angular velocity signal) close to a target angle (for example, angle determined as angle required to cancel out shake) and the second feedback circuit 72 makes the current positions, which are indicated by the current position signal from the position sensor 47, close to the reference positions.

Meanwhile, in a case where the displacement member 55 interferes with the fixation rod 46 and movement of the fixation rod 46 is hindered while the fixation mechanism 50 is switching from one of the fixation state and the release state to the other of the fixation state and the release state (that is, while the displacement member 55 is being opened or closed), the fixation rod 46 cannot reach a target position in the anti-vibration operation. The target position refers to a position to which the fixation rod 46 moves to cancel out vibration applied to the housing 11. Therefore, the anti-vibration mechanism drive circuit 62 performs feedback control to increase the output of the anti-vibration mechanism motor 40 for driving the anti-vibration mechanism 30. As a result, current consumption in the anti-vibration mechanism motor 40 is increased.

Therefore, in the first embodiment, to prevent an increase in current consumption in the anti-vibration mechanism motor 40, while the fixation mechanism 50 is switching from one of the fixation state and the release state to the other of the fixation state and the release state, the CPU 65 and the anti-vibration mechanism drive circuit 62 perform control with respect to the anti-vibration mechanism motor 40 such that interference between the fixation rod 46 and the fixation mechanism 50 does not occur.

More specifically, the first feedback circuit 70 obtains the above-described first value based on the result of detection performed by the gyro sensor 39 and outputs the first value. In addition, the second feedback circuit 72 obtains the above-described second value and outputs the second value. The first value and the second value are input to the synthesizer 76. The synthesizer 76 obtains the above-described third value based on the first value and the second value. The anti-vibration mechanism motor 40 is controlled based on the third value obtained by the synthesizer 76.

In addition, the CPU 65 adjusts the third value by, for example, changing the degree of difference between the first value and the second value. Here, the degree of difference refers to, for example, a ratio between the first value and the second value. Note that other examples of the degree of difference include the absolute value of the difference or the absolute value of the ratio×the difference.

In addition, while the fixation mechanism 50 is switching from one of the fixation state and the release state to the other of the fixation state and the release state, the CPU 65 performs control such that the closer the fixation mechanism 50 is to the fixation state, the larger the second value is made with respect to the first value and the closer the fixation mechanism 50 is to the release state, the smaller the second value is made with respect to the first value. That is, the closer the fixation mechanism 50 is to the fixation state, the larger the CPU 65 makes the second value, which acts in a direction for aligning the fixation rod 46 with the reference position, with respect to the first value, which acts on the anti-vibration operation. Therefore, a force that makes the fixation rod 46 close to the centers of the openings 51a and 54a becomes dominant in comparison with a force that makes the fixation rod 46 away from the centers of the openings 51a and 54a. Note that the closer the fixation mechanism 50 is to the release state, the smaller the CPU 65 makes the second value, which acts in the direction for aligning the fixation rod 46 with the reference position, with respect to the first value, which acts on the anti-vibration operation. Therefore, the closer the fixation mechanism 50 is to the release state, the smaller a force that makes the fixation rod 46 close to the centers of the openings 51a and 54a is.

In addition, in a case where the user turns the anti-vibration switch 16 on or off while looking into the ocular lens units 13R and 13L and the anti-vibration operation performed by the anti-vibration mechanism 30 is suddenly started due to a switch to the release state or the fixation state of the fixation mechanism 50 the user is likely to feel a sense of visual incongruity. Therefore, while the fixation mechanism 50 is switching from one of the fixation state and the release state to the other of the fixation state and the release state, the CPU 65 performs control in which the third value is made smaller than the third value obtained in a case where the fixation mechanism 50 is in the release state. In this case, while the fixation mechanism 50 is switching from one of the fixation state and the release state to the other of the fixation state and the release state, the third value indicating the driving force of the anti-vibration mechanism motor 40 is made small and thus the driving force of the anti-vibration mechanism motor 40 is made smaller than the driving force in a case where the fixation mechanism 50 is in the release state.

Note that, although the description has been made while using an example in which the third value is made small, the present disclosed technology is not limited thereto. For example, while the fixation mechanism 50 is switching from one of the fixation state and the release state to the other of the fixation state and the release state, the CPU 65 may perform control, in which the first value is made smaller than the first value obtained in a case where the fixation mechanism 50 is in the release state instead of the third value or in addition to the third value.

In addition, the CPU 65 determines, in accordance with the result of detection performed by the gyro sensor 39, whether to make the third value smaller than the third value obtained in a case where the fixation mechanism 50 is in the release state while the fixation mechanism 50 is switching from one of the fixation state and the release state to the other of the fixation state and the release state. For example, in a case where the magnitude of vibration (value determined based on amplitude of vibration per unit time and frequency of vibration per unit time) is larger than a threshold value determined in advance, the CPU 65 performs control in which the third value during a switch between the states of the fixation mechanism 50 is made smaller than the third value obtained in a case where the fixation mechanism 50 is in the release state. In this case, the user is likely to significantly feel a sense of visual incongruity due to application of vibration, of which the magnitude is larger than the threshold value determined in advance, in addition to a switch from one of the fixation state and the release state to the other of the fixation state and the release state (hereinafter, may be simply referred to as switch between the states of fixation mechanism 50). However, since the CPU 65 performs control in which the third value is made small during a switch between the states of fixation mechanism 50, a sense of visual incongruity felt by the user can be reduced. On the other hand, in a case where the magnitude of the vibration is smaller than the threshold value determined in advance, the CPU 65 does not change the third value regardless of the state of the fixation mechanism 50. Therefore, the accuracy of the anti-vibration operation can be maintained even during a switch between the states of fixation mechanism 50.

Note that, here, the third value during a switch between the states of fixation mechanism 50 is made smaller than the third value obtained in a case where the fixation mechanism 50 is in the release state. However, the present disclosed technology is not limited thereto. For example, the CPU 65 may determine, in accordance with the result of detection performed by the gyro sensor 39, whether to make the first value smaller than the first value obtained in a case where the fixation mechanism 50 is in the release state instead of the third value or in addition to the third value while the fixation mechanism 50 is switching from one of the fixation state and the release state to the other of the fixation state and the release state.

Next, the action of a part according to the present disclosed technology of the binocle 10 according to the first embodiment will be described with reference to FIG. 11. A control process shown in FIG. 11 is performed by the CPU 65 based on the control program 68.

Figure 11:
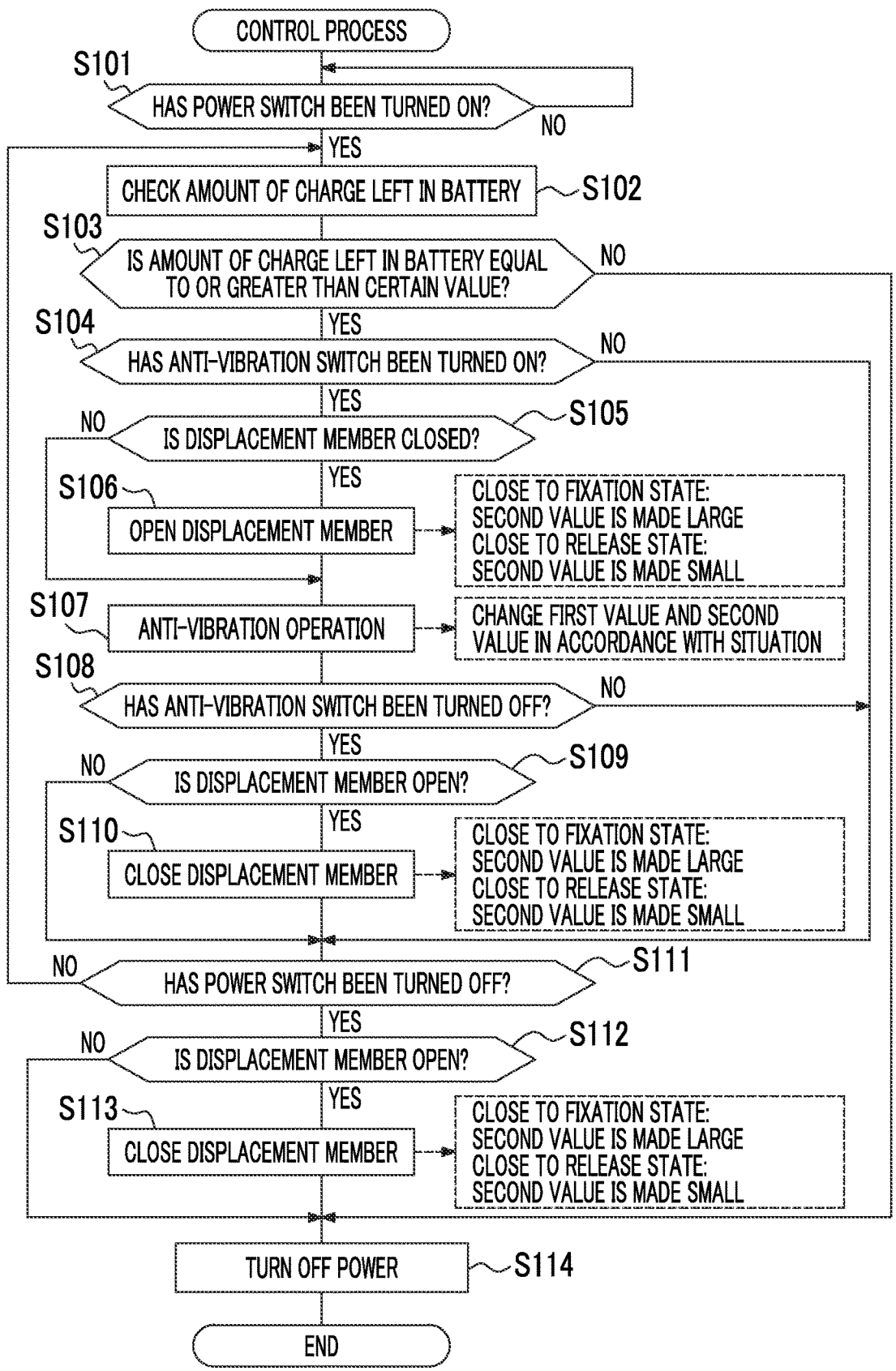
FIG. 11 is a flowchart showing an example of a control process for the binocle according to the first embodiment.

In the control process shown in FIG. 11, first, in step S101, the CPU 65 determines whether or not the power switch 15 has been turned on. In a case where it is determined that the power switch 15 has been turned on in step S101, the control process proceeds to step S102 since the result of the determination is positive. In a case where it is determined that the power switch 15 has not been turned on in step S101, the determination in step S101 is performed again since the result of the determination is negative.

In step S102, the CPU 65 checks the amount of charge left in a battery (not shown) of the binocle 10 and the control process proceeds to step S103.

In step S103, the CPU 65 determines whether or not the amount of charge left in the battery checked in step S102 is equal to or greater than a certain value. Here, the certain value may be a fixed value or a variable value that changes in accordance with a user's instruction. In a case where it is determined that the amount of charge left in the battery is equal to or greater than the certain value in step S103, the control process proceeds to step S104 since the result of the determination is positive. In a case where it is determined that the amount of charge left in the battery is smaller than the certain value in step S103, the control process proceeds to step S114 since the result of the determination is negative.

In step S104, the CPU 65 determines whether or not the anti-vibration switch 16 has been turned on. In a case where it is determined that the anti-vibration switch 16 has been turned on in step S104, the control process proceeds to step S105 since the result of the determination is positive. In a case where it is determined that the anti-vibration switch 16 has been turned off in step S104, the control process proceeds to step S111 since the result of the determination is negative.

In step S105, the CPU 65 determines whether or not the displacement member 55 is closed. In a case where it is determined that the displacement member 55 is closed in step S105, the control process proceeds to step S106 since the result of the determination is positive. In a case where it is determined that the displacement member 55 is open in step S105, the control process proceeds to step S107 since the result of the determination is negative.

In step S106, the CPU 65 controls the displacement member opening and closing motor 56 via the fixation mechanism drive circuit 60 such that the displacement member 55 is opened as shown in FIG. 7, for example. That is, the CPU 65 shifts the displacement member 55 from the first position to the second position so that the fixation mechanism 50 transitions from the fixation state to the release state.

In a case where the process in step S106 is performed, while the fixation mechanism 50 is switching from the fixation state to the release state, the CPU 65 performs control such that the closer the fixation mechanism 50 is to the fixation state, the larger the second value is made with respect to the first value and the closer the fixation mechanism 50 is to the release state, the smaller the second value is made with respect to the first value.

For example, as shown in FIG. 10, the first value is a value related to the driving force of the anti-vibration mechanism motor 40 based on the result of detection performed by the gyro sensor 39. The second value is a value related to the driving force for driving the anti-vibration mechanism motor 40 in a direction for aligning the fixation rod 46 with the centers of the openings 51a and 54a. The anti-vibration mechanism drive circuit 62 controls the anti-vibration mechanism motor 40 based on the third value obtained based on the first value and the second value. Accordingly, in comparison with a case where the second value and the first value are not controlled in accordance with a switch between the states of fixation mechanism 50, it is possible to perform control for canceling out vibration and control for avoiding interference between the fixation rod 46 and the fixation mechanism 50 during a switch from the fixation state to the release state of the fixation mechanism 50 with accuracy.

In addition, in a case where the process in step S106 is performed, while the displacement member 55 of the fixation mechanism 50 is switching from the fixation state to the release state, the CPU 65 performs control in which the third value is made smaller than the third value obtained in a case where the fixation mechanism 50 is in the release state.

Next, in step S107, the CPU 65 controls the anti-vibration mechanism drive circuit 62 such that the anti-vibration operation is started. In a case where the CPU 65 performs control in which the first value is made large with respect to the second value during the anti-vibration operation, the accuracy of the anti-vibration operation is increased. In addition, in a case where large-magnitude vibration is suddenly applied to the binocle 10 and the anti-vibration mechanism 30 suddenly rotates greatly in response to the large-magnitude vibration, the fixation rod 46 is likely to collide with the openings 51a and 54a, which causes damage. Therefore, in a case where the magnitude of applied vibration is equal to or greater than the threshold value determined in advance, the CPU 65 performs control in which the second value is made large with respect to the first value so that the anti-vibration operation is made gentle and damage to the fixation rod 46 and the openings 51a and 54a is prevented. In this manner, the CPU 65 changes the degree of difference between the first value and the second value in accordance with a situation to perform control in which the third value indicating the driving force of the anti-vibration mechanism motor 40 is adjusted.

Next, in step S108, the CPU 65 determines whether or not the anti-vibration switch 16 has been turned off. In a case where it is determined that the anti-vibration switch 16 has been turned off in step S108, the control process proceeds to step S109 since the result of the determination is positive. In a case where it is determined that the anti-vibration switch 16 has been turned on in step S108, the control process proceeds to step S111 since the result of the determination is negative.

In step S109, the CPU 65 determines whether or not the displacement member 55 is open. In a case where it is determined that the displacement member 55 is open in step S109, the control process proceeds to step S110 since the result of the determination is positive. In a case where it is determined that the displacement member 55 is closed in step S109, the control process proceeds to step S111 since the result of the determination is negative.

In step S110, the CPU 65 controls the displacement member opening and closing motor 56 via the fixation mechanism drive circuit 60 such that the displacement member 55 is closed as shown in FIG. 8, for example. That is, the CPU 65 shifts the displacement member 55 from the second position to the first position that the fixation mechanism 50 transitions from the release state to the fixation state. In a case where the process in step S110 is performed, while the displacement member 55 of the fixation mechanism 50 is switching from the release state to the fixation state, the CPU 65 performs control such that the closer the fixation mechanism 50 is to the release state, the smaller the second value is made with respect to the first value and the closer the fixation mechanism 50 is to the fixation state, the larger the second value is made with respect to the first value.

Next, in step S111, the CPU 65 determines whether or not power has been turned off. In a case where it is determined that the power has been turned off in step S111, the control process proceeds to step S112 since the result of the determination is positive. In a case where it is determined that the power has not been turned off in step S111, the control process proceeds to step S102 since the result of the determination is negative.

In step S112, the CPU 65 determines whether or not the displacement member 55 is open. In a case where it is determined that the displacement member 55 is open in step S112, the control process proceeds to step S113 since the result of the determination is positive. In a case where it is determined that the displacement member 55 is closed in step S112, the control process proceeds to step S114 since the result of the determination is negative.

In step S113, the CPU 65 performs the same process as that in step S110 described above, and the control process proceeds to step S114. Since the process in step S113 is performed, the displacement member 55 is in the fixation state in which the anti-vibration mechanism 30 is fixed when the power is off. Therefore, the anti-vibration mechanism 30 is not vibrated, is not damaged, and does not positionally deviate in the housing 11 due to vibration or the like generated in a case where the binocle 10 is carried.

In step S114, the CPU 65 turns off the power. After the process of step S114 is performed, the control process ends. The CPU 65 determines whether or not the displacement member 55 is open in step S112 after receiving a power-off signal in step S111 and in a case where the displacement member 55 is open, the CPU 65 turns off the power after the displacement member 55 is closed in step S113.

As described above, the binocle 10 in the first embodiment includes the optical systems, the gyro sensor 39 that can detect vibration with respect to the correction optical elements 31R and 31L, the anti-vibration mechanism 30 including the anti-vibration mechanism motor 40 driven based on the result of detection performed by the gyro sensor 39, the fixation mechanism 50 that fixes the position of the anti-vibration mechanism 30 by coming into contact with the fixation rod 46 of the anti-vibration mechanism 30, and the CPU 65. The CPU 65 controls the anti-vibration mechanism motor 40 via the anti-vibration mechanism drive circuit 62. Specifically, the anti-vibration mechanism motor 40 is subjected to feedback control by the anti-vibration mechanism drive circuit 62. The feedback control is realized by making the current angle of the anti-vibration mechanism motor 40 close to the target angle and the current position of the anti-vibration mechanism motor 40 close to the reference position. Note that the current angle is a value obtained by integrating the angular velocity signal input from the gyro sensor 39 to the anti-vibration mechanism drive circuit 62. The current position is a position indicated by the current position signal input from the position sensor 47 to the anti-vibration mechanism drive circuit 62.

In the feedback control, in a case where the displacement member 55 interferes with the fixation rod 46 and movement of the fixation rod 46 is hindered while the displacement member 55 is being opened or closed, the fixation rod 46 cannot reach the target position in the anti-vibration operation. Therefore, the CPU 65 performs the feedback control to increase the output of the anti-vibration mechanism motor 40 for driving the anti-vibration mechanism 30. As a result, current consumption in the anti-vibration mechanism motor 40 is increased.

Therefore, while the fixation mechanism 50 is switching from one of the fixation state, in which the fixation mechanism 50 fixes the position of the anti-vibration mechanism 30, and the release state, in which the fixation state of the fixation mechanism 50 is released, to the other of the fixation state and the release state, the CPU 65 performs control with respect to the anti-vibration mechanism motor 40 such that interference between the fixation rod 46 and the fixation mechanism 50 does not occur. Therefore, according to the present configuration, it is possible to avoid an increase in current consumption in the anti-vibration mechanism motor 40 caused by interference between the fixation rod 46 of the anti-vibration mechanism 30 and the fixation mechanism 50 in comparison with a case where the anti-vibration mechanism 30 is continuously rotated in accordance with the result of detection performed by the gyro sensor 39 at all times.

In addition, the CPU 65 controls the anti-vibration mechanism motor 40 with the third value obtained based on the first value and the second value. The first value is a value related to the driving force of the anti-vibration mechanism motor 40 based on the result of detection performed by the gyro sensor 39. The second value is a value related to the driving force for driving the anti-vibration mechanism motor 40 in a direction for aligning the fixation rod 46 with the centers of the openings 51a and 54a. The third value is a value indicating the driving force of the anti-vibration mechanism motor 40 (for example, control value for controlling anti-vibration mechanism motor 40) and is value that depends on the first value and the second value. Therefore, in comparison with a case where the anti-vibration mechanism motor 40 is controlled by means of only one value, it is possible to perform control for canceling out vibration and control for avoiding interference between the fixation rod 46 of the anti-vibration mechanism 30 and the fixation mechanism 50 during a switch from one of the fixation state and the release state to the other of the fixation state and the release state of the fixation mechanism 50 with accuracy.

In addition, the CPU 65 adjusts the third value by changing the degree of difference between the first value and the second value. Therefore, in comparison with a case where both of the first value and the second value are fixed values, it is possible to perform control for canceling out vibration and control for avoiding interference between the fixation rod 46 of the anti-vibration mechanism 30 and the fixation mechanism 50 during a switch from one of the fixation state and the release state to the other of the fixation state and the release state of the fixation mechanism 50 with accuracy.

In addition, the degree of difference is a ratio between the first value and the second value. Therefore, in comparison with a case where the degree of difference is a different value, it is possible to perform control for canceling out vibration and control for avoiding interference between the fixation rod 46 of the anti-vibration mechanism 30 and the fixation mechanism 50 during a switch from one of the fixation state and the release state to the other of the fixation state and the release state of the fixation mechanism 50 with ease.

In addition, during displacement of the displacement member 55 of the fixation mechanism 50, the CPU 65 performs control such that the closer the fixation mechanism 50 is to the fixation state, the larger the second value is made with respect to the first value and the closer the fixation mechanism 50 is to the release state, the smaller the second value is made with respect to the first value. Therefore, in comparison with a case where the second value is not changed, it is possible to perform control for avoiding interference between the fixation rod 46 of the anti-vibration mechanism 30 and the fixation mechanism 50 during a switch from one of the fixation state and the release state to the other of the fixation state and the release state of the fixation mechanism 50 with accuracy.

In addition, while the fixation mechanism 50 is switching from one of the fixation state and the release state to the other of the fixation state and the release state, the CPU 65 performs control in which the third value is made smaller than the third value obtained in a case where the fixation mechanism 50 is in the release state. Therefore, in comparison with a case where the third value is not changed regardless of the state of the fixation mechanism 50, the user is less likely to feel a sense of visual incongruity caused by a switch between the states of fixation mechanism 50.

In addition, while the fixation mechanism 50 is switching from one of the fixation state and the release state to the other of the fixation state and the release state, the CPU 65 performs control in which the first value is made smaller than the first value obtained in a case where the fixation mechanism 50 is in the release state. Therefore, in comparison with a case where the first value is not changed regardless of the state of the fixation mechanism 50, the user is less likely to feel a sense of visual incongruity caused by a switch between the states of fixation mechanism 50.

In addition, the CPU 65 may determine, in accordance with the result of detection performed by the gyro sensor 39, whether to make the third value smaller than the third value obtained in a case where the fixation mechanism 50 is in the release state while the fixation mechanism 50 is switching from one of the fixation state and the release state to the other of the fixation state and the release state. According to the present configuration, it is possible to change a method of controlling the third value depending on the magnitude of vibration in comparison with a case where the third value is not changed regardless of the state of the fixation mechanism 50.

In addition, the CPU 65 may determine, in accordance with the result of detection performed by the gyro sensor 39, whether to make the first value smaller than the first value obtained in a case where the fixation mechanism 50 is in the release state while the fixation mechanism 50 is switching from one of the fixation state and the release state to the other of the fixation state and the release state. According to the present configuration, it is possible to change a method of controlling the first value depending on the magnitude of vibration in comparison with a case where the first value is not changed regardless of the state of the fixation mechanism 50.

In addition, the anti-vibration mechanism 30 includes the gimbal structure. In the anti-vibration mechanism 30, the gimbal structure is operated in accordance with the driving force of the anti-vibration mechanism motor 40. Therefore, it is possible to configure the anti-vibration mechanism 30 with a simple structure in comparison with a case where the gimbal structure is not used for the anti-vibration mechanism 30.

In addition, the fixation mechanism 50 includes the displacement member 55 and the displacement member 55 is displaced between the first position for the fixation state of the anti-vibration mechanism 30 and the second position for the release state of the anti-vibration mechanism 30. Therefore, it is possible to configure the fixation mechanism 50 with a simple structure in comparison with a case where the fixation mechanism 50 does not include the displacement member 55.

In addition, the fixation rod 46 protrudes from the anti-vibration mechanism 30, and the displacement member 55 holds the fixation rod 46 at the first position and releases the fixation rod 46 at the second position. Therefore, it is possible to easily switch between the fixation state and the release state in comparison with a case where a switch between the fixation state and the release state is performed without use of the fixation rod 46 and the displacement member 55.

In addition, the anti-vibration mechanism 30 includes the first holder 32 and the second holder 33 holding the optical systems. The anti-vibration mechanism 30 causes the first holder 32 and the second holder 33 to oscillate in accordance with the driving force of the anti-vibration mechanism motor 40 corresponding to the result of detection performed by the gyro sensor 39. Therefore, it is possible to perform the anti-vibration operation with high accuracy in comparison with a case where the anti-vibration mechanism 30 does not cause the first holder 32 and the second holder 33 to oscillate in accordance with the driving force of the anti-vibration mechanism motor 40. That is, according to the present configuration, an image shake caused by vibration on the housing 11 is suppressed with high accuracy in comparison with a case where the anti-vibration mechanism motor 40 is not provided.

In addition, the CPU 65 adjusts the driving force of the anti-vibration mechanism motor 40 by performing feedback control with respect to the anti-vibration mechanism motor 40. Therefore, the anti-vibration mechanism motor 40 can be controlled precisely in comparison with a case where the anti-vibration mechanism motor 40 is not subjected to the feedback control.

Second Embodiment

In the first embodiment, the fixation mechanism 50 fixes the position of the anti-vibration mechanism 30 by coming into contact with the fixation rod 46 provided on the anti-vibration mechanism 30. However, the structures of the fixation mechanism 50 and the anti-vibration mechanism 30 are not limited thereto.

Figure 12:
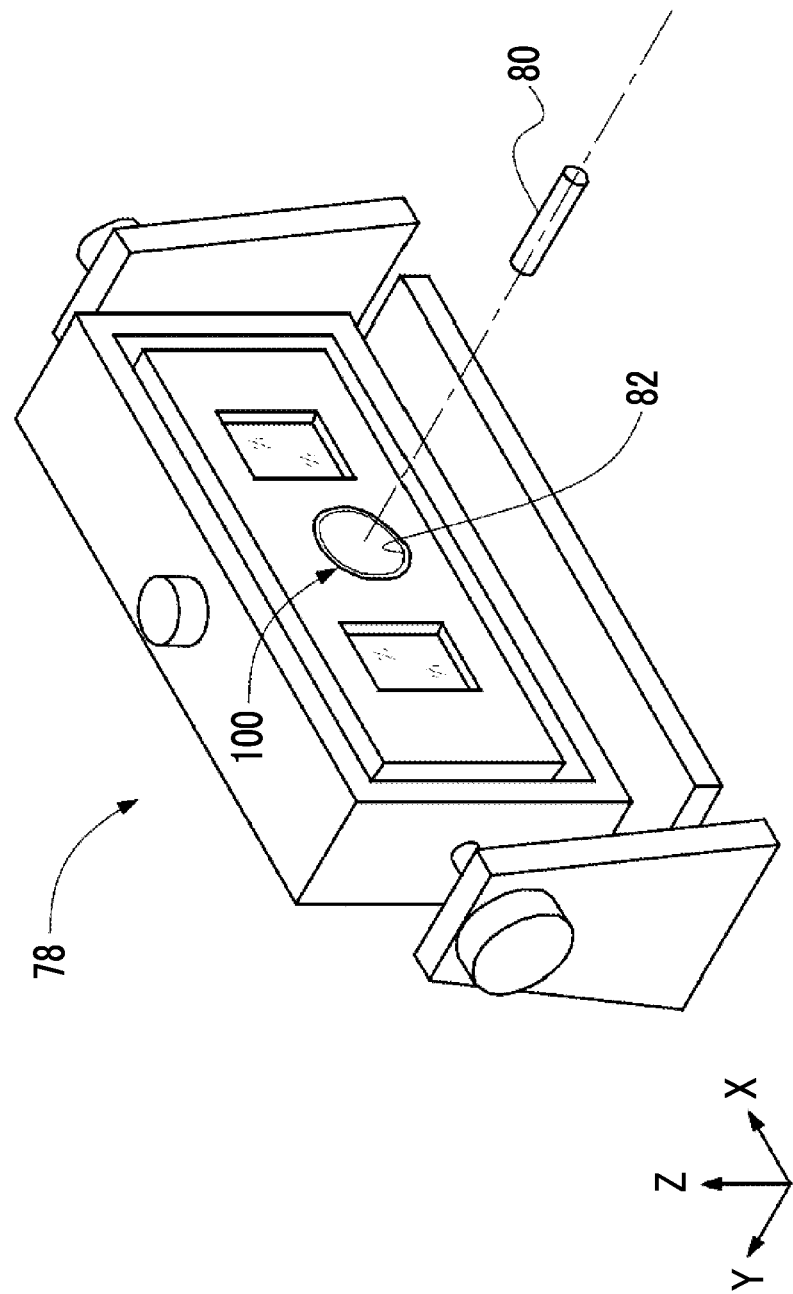
FIG. 12 is a perspective view showing an example of the configurations of an anti-vibration mechanism and a fixation mechanism included in a binocle according to a second embodiment.
Figure 13:
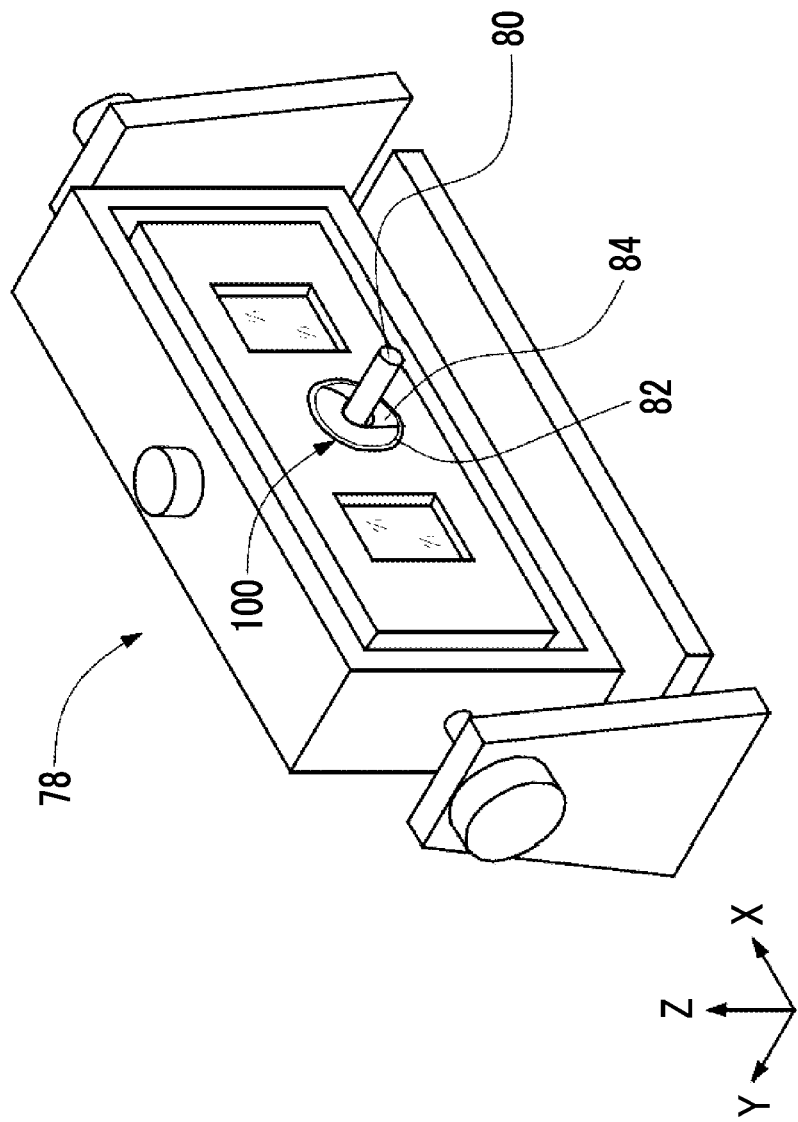
FIG. 13 is a perspective view showing an example of the way in which the anti-vibration mechanism is fixed by the fixation mechanism included in the binocle according to the second embodiment.

For example, as shown in FIGS. 12 and 13, the binocle 10 according to the second embodiment includes an opening and closing mechanism 100 at the central portion of a rear surface of an anti-vibration mechanism 78. The opening and closing mechanism 100 includes an opening 82. A fixation rod 80 erected on an inner wall surface (not shown) of the housing 11 is inserted into the opening 82. Note that the opening and closing mechanism 100 is an example of a "specific portion" according to the present disclosed technology and the fixation rod 80 and the opening and closing mechanism 100 are examples of "fixation mechanisms" according to the present disclosed technology.

The opening and closing mechanism 100 includes a displacement member 84 and the displacement member 84 is incorporated inside the opening 82. The displacement member 84 is an example of a "displacement member" according to the present disclosed technology. The displacement member 84 is displaced between a first position and a second position. At the first position, the displacement member 84 protrudes from the opening 82 to hold the fixation rod 80. Accordingly, a fixation state in which the position of the anti-vibration mechanism 78 is fixed is realized (refer to FIG. 13). In addition, at the second position, the displacement member 84 is withdrawn from the opening 82 so that the fixation rod 80 in a held state is released. Accordingly, a release state in which the fixation state is released is realized (refer to FIG. 12). Other configurations of the binocle 10 according to the second embodiment are the same as those of the binocle 10 according to the first embodiment. Therefore as with the binocle 10 according to the first embodiment, the binocle 10 according to the second embodiment also can perform control for avoiding interference between the fixation rod 80 and the displacement member 84 during a switch from one of the fixation state and the release state to the other of the fixation state and the release state. That is, the binocle 10 according to the second embodiment has the same actions and effects as the binocle 10 according to the first embodiment.

Although the binocle has been used as an example in the above-described embodiments, the present disclosed technology is not limited thereto and may be applied to, for example, a monocle. In addition, the present disclosed technology may be applied to various imaging apparatuses such as a single-eye camera, a multi-eye camera, a compact camera, and a mirrorless camera and the present disclosed technology is useful for an imaging apparatus including a telephoto lens which is easily influenced by a camera shake.

In the above-described embodiments, the displacement member 55 is displaced between the first position, at which the displacement member 55 protrudes from the openings 51a and 54a, and the second position, at which the displacement member 55 is withdrawn from the openings 51a and 54a, in a case where the displacement member opening and closing motor 56 connected to the pin 53 is operated. However, the present disclosed technology is not limited thereto. The displacement member 55 may be displaced between the first position and the second position in a case where the pin 53 is manually rotated from outside the housing 11.

Figure 14:
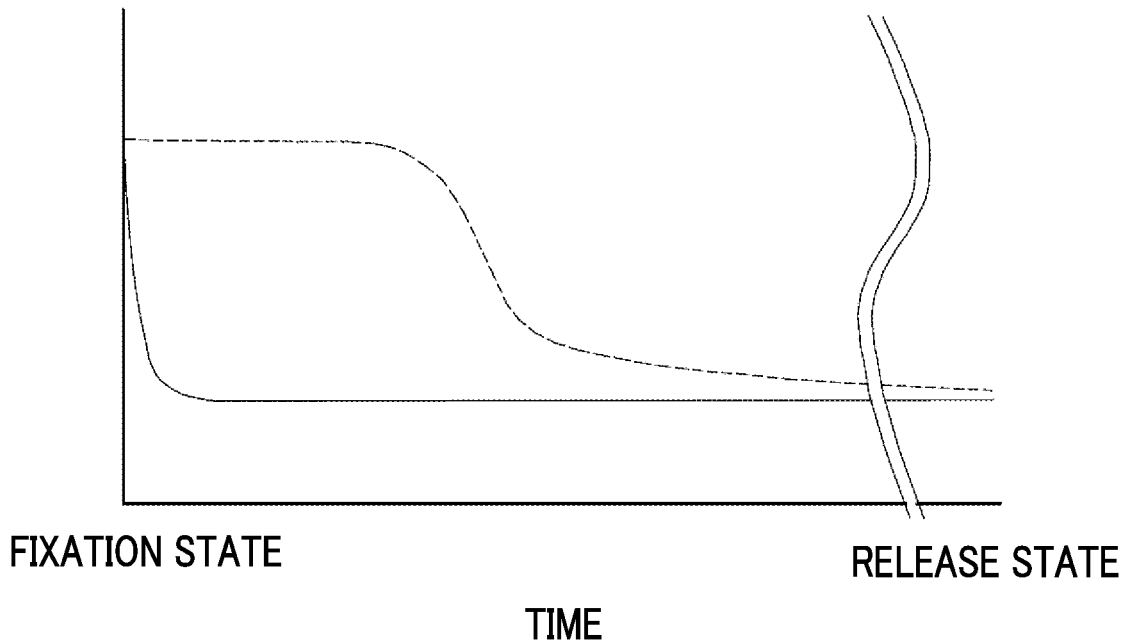
FIG. 14 is a graph showing how much a second value changes during displacement from a fixation state to a release state of a displacement member in a case where a first value is constant.

For example, a graph in FIG. 14 shows how much the second value changes during displacement from the fixation state to the release state of the displacement member 55 in a case where the first value is constant. In the above-described embodiments, during displacement from the fixation state to the release state of the displacement member 55, the CPU 65 gradually decreases the second value non-linearly in a short time as shown by a solid line in the graph. The second value is a value for driving the anti-vibration mechanism motor 40 in a direction for alignment with the centers of the openings 51a and 54a. In a case where the first value is constant, the CPU 65 performs control such that the closer the fixation mechanism 50 is to the fixation state, the larger the second value is made and the closer to the fixation mechanism 50 is to the release state, the larger the second value is made. The way in which the second value is changed is not limited thereto and as shown by a broken line in FIG. 14, the CPU 65 may gradually decrease the second value more slowly than in the case of the change shown by the solid line. In this case, in comparison with a case where the second value is gradually decreased in a short time (graph shown by solid line in FIG. 14), the user is less likely to feel a sense of visual incongruity caused by a switch between the states of fixation mechanism 50. The way in which the second value is changed that is shown in FIG. 14 is merely an example and the CPU 65 can gradually decrease the second value in any way.

Figure 15:
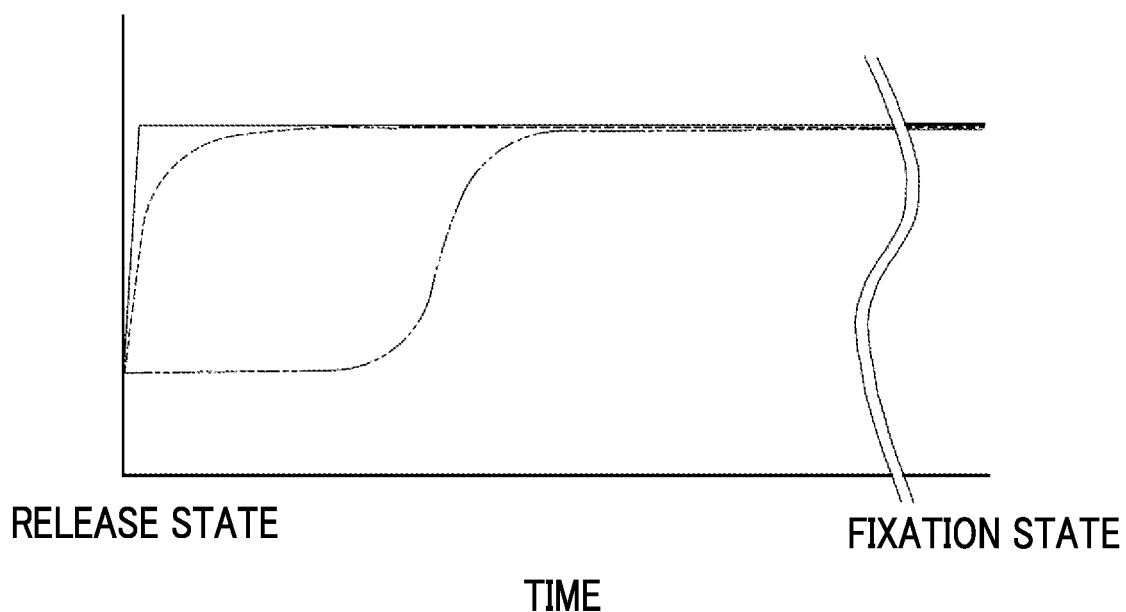
FIG. 15 is a graph showing how much the second value changes during displacement from the release state to the fixation state of the displacement member in a case where the first value is constant.

For example, a graph in FIG. 15 shows how much the second value changes during displacement from the release state to the fixation state of the displacement member 55 in a case where the first value is constant. In the above-described embodiments, during displacement from the release state to the fixation state of the displacement member 55, the CPU 65 linearly increases the second value in a short time as shown by a solid line in the graph. However, the way in which the second value is changed is not limited thereto and as shown by a broken line in FIG. 15, the CPU 65 may gradually increase the second value non-linearly. In this case, in comparison with a case where the second value is linearly increased (graph shown by solid line in FIG. 15), the user is less likely to feel a sense of visual incongruity caused by a switch between the states of fixation mechanism 50. In addition, as shown by a two-dot chain line in FIG. 15, the CPU 65 may gradually increase the second value non-linearly more slowly than in the case of the change shown by the solid line. In this case, in comparison with a case where the second value is linearly increased in a short time, the user is less likely to feel a sense of visual incongruity caused by a switch between the states of fixation mechanism 50. The way in which the second value is changed that is shown in FIG. 15 is merely an example and the CPU 65 can gradually increase the second value in any way.

In addition, in the above-described embodiments, each of the fixation rods 46 and 80 has a circular columnar shape. However, the shape of the fixation rod is not limited thereto. For example, the fixation rod may be a columnar member having a quadrangular columnar shape or a triangular columnar shape. In addition, in the above-described embodiments, the number of the fixation rods 46 provided on the anti-vibration mechanism 30 or the number of the fixation rods 80 erected on the inner wall surface of the housing 11 is one. However, a plurality of fixation rods may be provided. In this case, at least one of the plurality of provided fixation rods is held by the displacement member.

In addition, in the above-described embodiments, the displacement member 55 is displaced between the first position and the second position in a case where the rotary ring 54 is rotated. However, the present disclosed technology is not limited thereto. For example, the displacement member may include two or more flat plate shutters that hold the fixation rod in any direction such as a vertical direction or a lateral direction.

Figure 16:
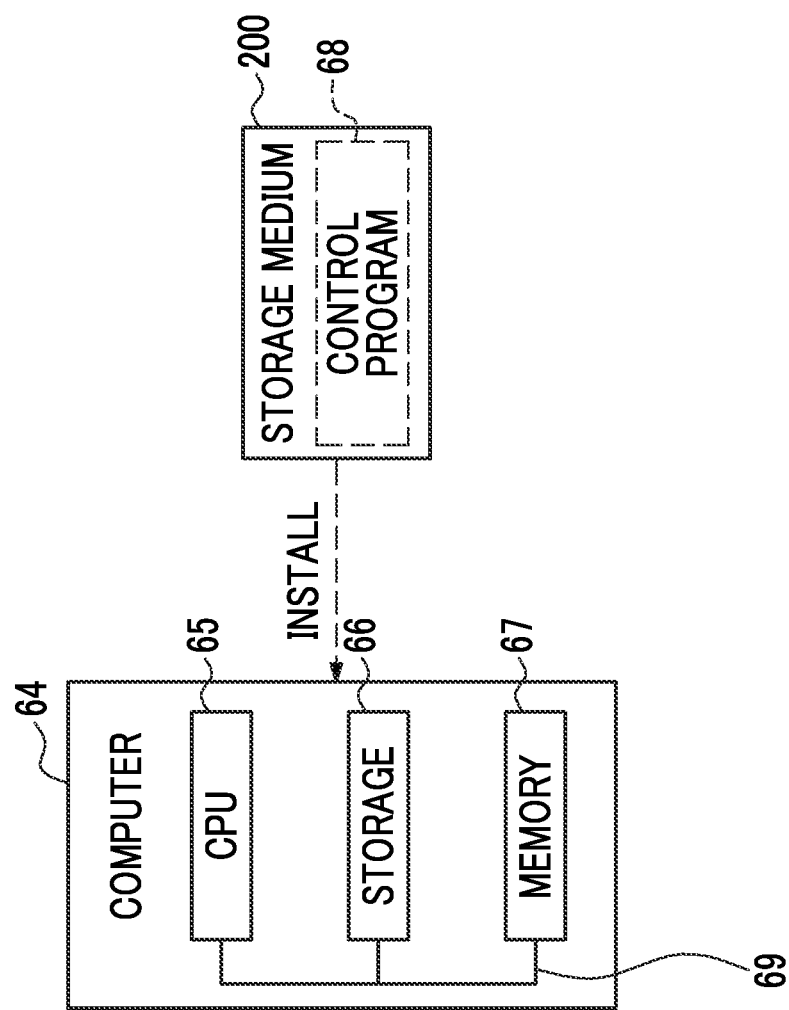
FIG. 16 is a conceptual diagram showing an example of the way in which a control program according to an embodiment is installed in a computer of a binocle.

In addition, in the above-described embodiments, an example in which the control program 68 is stored in the storage 66 has been described. However, the present disclosed technology is not limited thereto. For example, as shown in FIG. 16, the control program 68 may be stored in a storage medium 200. Examples of the storage medium 200 include any portable storage medium such as an SSD or a USB memory. In this case, the control program 68 stored in the storage medium 200 is installed in the computer 64 and is executed on the memory 67 by the CPU 65.

In addition, the control program 68 may be stored in a storage unit of another computer, a server apparatus, or the like that is connected to the computer 64 via a communication network (not shown). In this case, the control program 68 may be downloaded from the storage unit of the other computer, the server apparatus, or the like to the storage 66 and be installed in the computer 64.

Note that, it is not necessary to store the entire control program 68 in the storage unit of the other computer, the server apparatus, or the like that is connected to the computer 64 or in the storage 66 and the control program 68 may be stored partially.

In FIG. 9, an example in which the computer 64 is built in the binocle 10 is shown. However, the present disclosed technology is not limited thereto and for example, the computer 64 may be provided outside the binocle 10.

In the example shown in FIG. 9, the CPU 65 is a single CPU by a plurality of CPUs may be provided. In addition, a GPU may be applied instead of the CPU 65.

In the example shown in FIG. 9, the computer 64 is shown. However, the present disclosed technology is not limited thereto and a device including an ASIC, an FPGA, and/or a PLD may be applied instead of the computer 64. In addition, a combination of a hardware configuration and a software configuration may be used instead of the computer 64.

The computer 64 shown in FIG. 9 includes the CPU 65, which is a general-purpose processor functioning as a hardware resource performing the control process by executing the control program 68. However, for example, instead of the CPU 65, a dedicated processor having a circuit configuration specially designed for performing a specific process like an FPGA, a PLD, or an ASIC may be provided. A memory is built in or connected to any processor, and the processor performs the control process by using the memory.

As each of the fixation mechanism drive circuit 60 and the anti-vibration mechanism drive circuit 62 shown in FIG. 9, a general-purpose device or a dedicated device that is specially designed for performing a specific process and includes an FPGA, a PLD, and/or an ASIC may be applied.

A hardware resource that performs the control process may be composed of one of these various devices or a combination of two or more devices of the same type or different types (for example, combination of plurality of FPGAs or combination of CPU and FPGA).

As an example of a configuration with one processor, first, there is an example in which one processor is composed of a combination of one or more CPUs and software and the processor functions as a hardware resource performing the control process. Second, there is an example in which a processor that realizes, with one IC chip, the functions of the entire system including a plurality of hardware resources performing the control process as represented by an SoC is used. As described above, the control process is realized by using one or more of the above-described various processors as a hardware resource.

In addition, as the hardware structure of the processor, more specifically, an electric circuit in which circuit elements such as semiconductor elements are combined with each other can be used. In addition, the above-described control process is merely an example. Therefore, it is a matter of course that an unnecessary step may be deleted, a new step may be added, and the order in which processes are performed may be changed without departing from the spirit.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, "A and/or B" has the same meaning as "at least one of A or B". That is, "A and/or B" means "A, B, or a combination of A and B". In addition, in the present specification, the same concept as in the case of "A and/or B" applies to a case where three or more matters are expressed together by "and/or".

All publications, patent applications, and technical standards described in the present specification are incorporated herein by reference to the same extent as if each publication, patent application, or technical standard was specifically and individually indicated to be incorporated by reference.

What is claimed is:

1. An optical device which includes an optical system, the optical device comprising:
   a sensor that detects vibration on the optical device;
   an anti-vibration mechanism that includes a drive source driven based on a result of detection performed by the sensor;
   a fixation mechanism that fixes a position of the anti-vibration mechanism by coming into contact with a specific portion of the anti-vibration mechanism; and
   a processor that performs control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state,
   wherein the processor controls the drive source with a third output, indicating a driving force for driving the drive source, which is obtained based on a first output related to a driving force of the drive source based on the result of the detection and a second output related to a driving force of the drive source in a direction for aligning the specific portion with a reference position determined in advance, and
   wherein actuation of the fixation mechanism is initiated prior to the third output being obtained.

2. The optical device according to claim 1,
   wherein the processor adjusts the third output by changing a degree of difference between the first output and the second output.

3. The optical device according to claim 2,
wherein the degree of difference is a ratio between the first output and the second output.

4. The optical device according to claim 1,
wherein, while the fixation mechanism is switching from one of the fixation state and the release state to the other of the fixation state and the release state, the processor performs control such that the closer the fixation mechanism is to the fixation state, the larger the second output is made with respect to the first output and the closer the fixation mechanism is to the release state, the smaller the second output is made with respect to the first output.

5. The optical device according to claim 1,
wherein, while the fixation mechanism is switching from one of the fixation state and the release state to the other of the fixation state and the release state, the processor performs control such that the third output is made smaller than the third output obtained in a case where the fixation mechanism is in the release state.

6. The optical device according to claim 1,
wherein, while the fixation mechanism is switching from one of the fixation state and the release state to the other of the fixation state and the release state, the processor performs control such that the first output is made smaller than the first output obtained in a case where the fixation mechanism is in the release state.

7. The optical device according to claim 5,
wherein the processor determines, in accordance with the result of the detection performed by the sensor, whether to make the third output smaller than the third output obtained in a case where the fixation mechanism is in the release state while the fixation mechanism is switching from one of the fixation state and the release state to the other of the fixation state and the release state.

8. The optical device according to claim 6,
wherein the processor determines, in accordance with the result of the detection performed by the sensor, whether to make the first output smaller than the first output obtained in a case where the fixation mechanism is in the release state while the fixation mechanism is switching from one of the fixation state and the release state to the other of the fixation state and the release state.

9. The optical device according to claim 1,
wherein the anti-vibration mechanism includes a gimbal structure, and
the gimbal structure is operated in accordance with a driving force of the drive source in the anti-vibration mechanism.

10. The optical device according to claim 1,
wherein the fixation mechanism includes a displacement member, and
the displacement member is displaced between a first position for the fixation state of the anti-vibration mechanism and a second position for the release state of the anti-vibration mechanism.

11. The optical device according to claim 10,
wherein the specific portion is a protruding portion protruding from the anti-vibration mechanism, and
the displacement member holds the protruding portion at the first position and releases the protruding portion at the second position.

12. The optical device according to claim 1,
wherein the anti-vibration mechanism includes a holder holding the optical system, and
the anti-vibration mechanism causes the holder to oscillate in accordance with a driving force of the drive source corresponding to the result of the detection performed by the sensor.

13. The optical device according to claim 1,
wherein the processor adjusts a driving force of the drive source by performing feedback control with respect to the drive source.

14. A binocle comprising:
the optical device according to claim 1; and
an ocular lens on which observation target light indicating an observation target is incident via the optical system.

15. A control method for an optical device having an optical system, the optical device including a sensor that detects vibration on the optical device, an anti-vibration mechanism that includes a drive source driven based on a result of detection performed by the sensor, and a fixation mechanism that fixes a position of the anti-vibration mechanism by coming into contact with a specific portion of the anti-vibration mechanism, the method comprising:
performing control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state; and
performing control the drive source with a third output, indicating a driving force for driving the drive source, which is obtained based on a first output related to a driving force of the drive source based on the result of the detection and a second output related to a driving force of the drive source in a direction for aligning the specific portion with a reference position determined in advance,
wherein actuation of the fixation mechanism is initiated prior to the third output being obtained.

16. A non-transitory recording medium recording a program that causes a computer applied to an optical device having an optical system, the optical device including a sensor that detects vibration on the optical device, an anti-vibration mechanism that includes a drive source driven based on a result of detection performed by the sensor, and a fixation mechanism that fixes a position of the anti-vibration mechanism by coming into contact with a specific portion of the anti-vibration mechanism, to execute a process comprising:
performing control with respect to the drive source such that interference between the specific portion and the fixation mechanism does not occur while the fixation mechanism is switching from one of a fixation state, in which the fixation mechanism fixes the position of the anti-vibration mechanism, and a release state, in which the fixation state of the fixation mechanism is released, to the other of the fixation state and the release state; and
performing control the drive source with a third output, indicating a driving force for driving the drive source, which is obtained based on a first output related to a driving force of the drive source based on the result of the detection and a second output related to a driving force of the drive source in a direction for aligning the specific portion with a reference position determined in advance, wherein actuation of the fixation mechanism is initiated prior to the third output being obtained.

* * * * *